United States Patent [19]

Velissaropoulos et al.

[11] Patent Number: 5,778,223

[45] Date of Patent: *Jul. 7, 1998

[54] DICTIONARY FOR ENCODING AND RETRIEVING HIERARCHICAL DATA PROCESSING INFORMATION FOR A COMPUTER SYSTEM

[75] Inventors: T. Dora Velissaropoulos, Toronto; Peter K. Shum, Richmond Hill, both of Canada

[73] Assignee: International Business Machines Corporation, Armonk, N.Y.

[*] Notice: The term of this patent shall not extend beyond the expiration date of Pat. No. 5,525,442.

[21] Appl. No.: 773,220

[22] Filed: Dec. 23, 1996

Related U.S. Application Data

[60] Continuation of Ser. No. 487,298, Jun. 7, 1995, abandoned, which is a division of Ser. No. 853,062, Mar. 17, 1992, Pat. No. 5,632,031.

[51] Int. Cl.$^6$ ............................................. G06F 17/30
[52] U.S. Cl. ........................ 395/611; 395/613; 395/615
[58] Field of Search ................................ 395/611, 613, 395/615, 60, 61, 62

[56] References Cited

U.S. PATENT DOCUMENTS

| | | | |
|---|---|---|---|
| 5,202,977 | 4/1993 | Pasetes, Jr. et al. | 395/500 |
| 5,257,365 | 10/1993 | Powers | 395/600 |
| 5,327,559 | 7/1994 | Priven et al. | 395/700 |
| 5,345,587 | 9/1994 | Fehskens et al. | 395/650 |
| 5,448,726 | 9/1995 | Cramsie et al. | 395/600 |
| 5,632,031 | 5/1997 | Velissaropoulos et al. | 395/611 |

*Primary Examiner*—Wayne Amsbury
*Attorney, Agent, or Firm*—Marilyn Smith Dawkins, Esq.; Sterne, Kessler, Goldstein & Fox P.L.L.C.

[57] ABSTRACT

A data transmission dictionary is provided, which is adapted for use by a computer system for encoding, storing, or retrieving hierarchically related data transmission information. The dictionary is comprised of a group of one or more computer searchable definition trees relating to transmission information of the computer system. The trees are derived from a first definition group which includes characteristics of commands, replies or data usable by the computer system. The characteristics include structure and value properties and restrictions, if any, applying to the commands, replies or data. Each tree represents, respectively, a definition of a the command, reply or data to which it relates. Each tree includes a root node identified by name, e.g., a codepoint. The root node includes information describing the type of definition tree concerned (i.e., whether it relates to a command, reply or data), and may include one or more internal or terminal descendant nodes. These nodes represent components of the definition represented by the tree. The descendent nodes include level information describing the level of the node within its tree. The nodes may include attribute information, and may include value requirements relating to transmission information represented by the nodes.

40 Claims, 30 Drawing Sheets

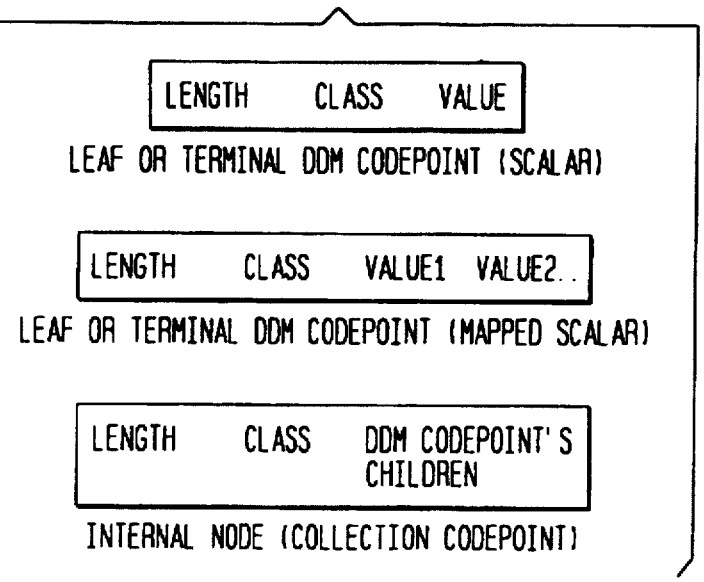

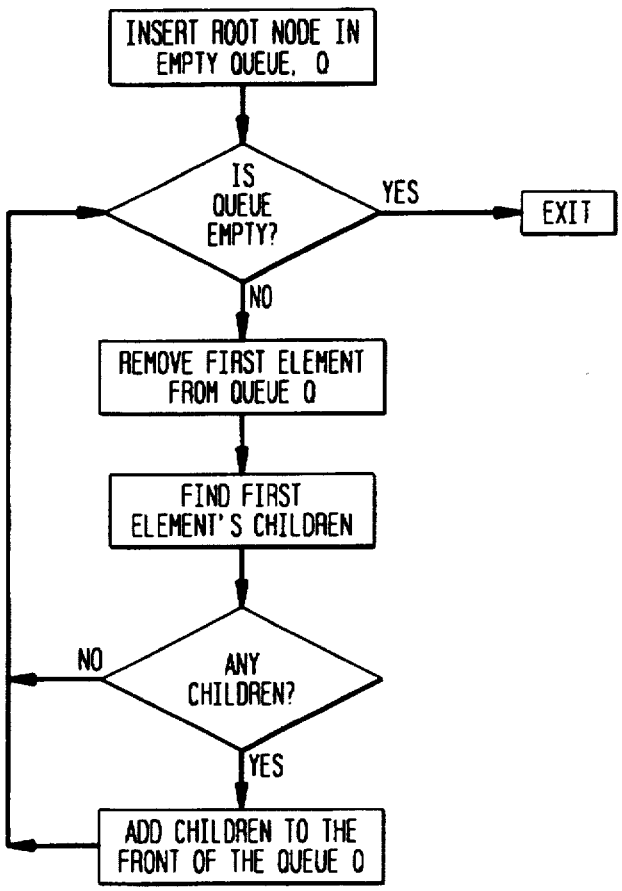

FIG. 4A
(PRIOR ART)

EXCSATRD - SERVER ATTRIBUTES REPLY DATA
EXCSATRD <ODDBASD> X'1443'

| length | * | |
|---|---|---|
| class | CLASS - OBJECT DESCRIPTOR <ODDPRMD> | |
| sprcls | COLLECTION - COLLECTION OBJECT <ODDPRMD> | |
| title | SERVER ATTRIBUTES REPLY DATA | |
| status | | TERM STATUS |
| TERM NEW IN LEVEL 1 | | |
| HELP | | DESCRIPTION |
| THIS COLLECTION IS USED TO RETURN THE FOLLOWING INFORMATION IN RESPONSE TO AN EXCSAT COMMAND: <br><br> - THE TARGET SERVER'S CLASS NAME <br><br> - THE TARGET SERVER'S SUPPORT LEVEL FOR EACH CLASS OF MANAGER REQUESTED BY THE SOURCE (SEE THE DESCRIPTIONS OF THE TERMS EXCSAT, SERVER, AND MANAGER) <br><br> - THE TARGET SERVER'S PRODUCT RELEASE LEVEL <br><br> - THE TARGET SERVER'S EXTERNAL NAME <br><br> - THE TARGET SERVER'S NAME | | |
| clsvar | NIL | |
| insvar | | INSTANCE VARIABLES |
| length | * | |
| class | X'1443' | |
| extnam | INSTANCE_OF | EXTNAM - EXTERNAL NAME <ODDBASD> OPTIONAL |

FIG. 5A
(PRIOR ART)

PART 1

DDM DICTIONARY ENTRY

OPNQRY <ODDRDBD> X'200C'

| | | COMMENTS |
|---|---|---|
| length | * | TITLE: THIS IS OPNQRY TOP LEVEL COMMAND |
| | | *OPNQRY IS THE MNEMONIC |
| | | *<ODDRDBD> IS THE SUB-DICTIONARY |
| | | THE DICTIONARY IS SUBDIVIDED IN |
| | | VARIOUS PARTS |
| | | THE LENGTH OF THIS DEFINITION IS VARIABLE |
| class | CLASS - OBJECT DESCRIPTOR <ODDPRMD> | THE CLASS OF THE DEFINITION |
| sprcls | COMMAND - COMMAND <ODDPRMD> | THIS DESCRIBES A COMMAND |
| title | OPEN QUERY | TITLE (FULL COMMAND NAME) |
| DSS CARRIER: | RQSDSS | WHICH CARRIER: RQSDSS |
| clsvar | NIL | |
| insvar | | INSTANCE VARIABLES  START OF PARAMETERS |
| length | * | LENGTH IS VARIABLE |
| class | X'200C' | CODEPOINT OF OPEN QUERY (OPNQRY) |
| rdbnam | INSTANCE_OF RDBNAM - RELATIONAL DATABASE NAME <ODDRDBD> | *FIRST PARAMETER |
| | OPTIONAL | -INSTANCE_OF ATTRIBUTE HAS THE CODEPOINT |
| | CMDTRG | OF A CLASS OBJECT AS ITS VALUE. IT |
| | | INDICATES THE VALUE OF THE VARIABLE |
| | | BEING DESCRIBED IS AN INSTANCE OF THE |
| | | SPECIFIED CLASS |
| | | -RDBNAM IS OPTIONAL |
| pkgnamcsn | INSTANCE_OF PKGNAMCSN - RDB PACKAGE NAME, CONSISTENCY | *SECOND PARAMETER |
| | TOKEN, AND SECTION NUMBER <ODDRDBD> | -PKGNAMCSN IS REQUIRED |
| | REQUIRED | |
| qryblksz | INSTANCE_OF QRYBLKSZ - QUERY BLOCK SIZE <ODDRDBD> | |
| | REQUIRED | |

FIG. 5A
(PRIOR ART)

PART 2

```
qryblkctl
         INSTANCE_OF QRYBLKCTL - QUERY BLOCK PROTOCOL CONTROL
                    <QDDRDBD>
         OPTIONAL
         ENUVAL     X'2410' - FRCSNGROW - FORCE SINGLE ROW QUERY        --> QRYBLKCTL IS AN OPTIONAL PARAMETER. IF
                    PROTOCOL <QDDRDBD>                                      SPECIFIED IT CAN ONLY CONTAIN FRCSNGROW
         DFTVAL  ;:                                                         THE DEFAULT IS NULL.
         NOTE       MEANS THAT THE VALUE SPECIFIED IN THE
                    PACKAGE FOR THIS PARAMETER SHOULD BE USED
                    TO DETERMINE WHICH QUERY PROTOCOL IS TO BE
                    USED FOR THIS QUERY clscmd   NIL                                                            DEFINES A SET OF COMMANDS DESCRIBING
                                                                        THE OPERATIONS THAT CAN BE PERFORMED
                                                                        ON THE SPECIFIED CLASS; TYPICALLY
                                                                        THESE ARE INSTANCE CREATION AND
                                                                        INITIALIZATION. EACH DEFINITION IN THE LIST
                                                                        DESCRIBES A SINGLE CLASS COMMAND WHOSE
                                                                        NAME IS SPECIFIED BY THE CODEPOINT OF ITS
                                                                        CLASS inscmd   NIL                                                            *DEFINES A SET OF COMMANDS THAT CAN BE
                                                                        PERFORMED BY INSTANCES OF THE CLASS. EACH
                                                                        DEFINITION IN THE LIST DESCRIBES A SINGLE
                                                                        INSTANCE COMMAND WHOSE NAME IS SPECIFIED
                                                                        BY THE CODEPOINT OF THE CLASS
```

FIG. 5B
(PRIOR ART)

| | | | |
|---|---|---|---|
| cmddta X'2412' | INSTANCE_OF | SQLDTA - SQL PROGRAM VARIABLE DATA <DDRDBD> | COMMAND OBJECTS | →COMMAND DATA SQLDTA IS A COLLECTION OBJECT. THIS PART IS SENT WITH THE COMMAND. |
| | OPTIONAL NOTE | SPECIFIED WHEN THE QUERY HAS INPUT VARIABLES | |
| rpydta X'2408' | INSTANCE_OF | SQLCARD - SQL COMMUNICATIONS AREA REPLY DATA <DDRDBD> | REPLY OBJECTS | →REPLY DATA THIS PART IS SENT AS A REPLY TO THE COMMAND AND THE COMMAND DATA |
| | OPTIONAL NOTE | THE SQLCARD OBJECT CANNOT BE RETURNED WITHOUT ALSO RETURNING A REPLY MESSAGE. AN SQLCARD MUST FOLLOW ANY REPLY MESSAGE THAT IS RETURNED | | * NOTES USUALLY CLARIFY OR TO HIGHLIGHT THE SEMANTIC OR OPERATION OF THE PARAMETER. |
| X'241A' | INSTANCE_OF | QRYDSC - QUERY ANSWER SET DESCRIPTION <DDRDBD> | |
| | OPTIONAL REPEATABLE NOTE | CONTAINS THE DESCRIPTION, OR A PORTION OF THE DESCRIPTION, OF THE ANSWER SET DATA | |
| X'241B' | INSTANCE_OF | QRYDTA - QUERY ANSWER SET DATA <DDRDBD> | |
| | OPTIONAL REPEATABLE NOTE | CONTAINS SOME PORTION OF THE ANSWER SET DATA FOR THE QUERY OR AN SQLCA THAT REPORTS A NON-TERMINATING ERROR. CAN ONLY BE RETURNED IF LMTBLKPRC QUERY PROTOCOLS ARE BEING USED | |

FIG. 8
(PRIOR ART)

1. RETRIEVE ACCRDBRM (2201) FILE
2. DEFINITION = 2201
3. SCAN FOR PARAMETERS IN ACCRDBRM
4. PARAMETER LIST IS:
   1149, 002F, 0035, 112E, 2103, 2135, 1153, 2125, 11A0
5. POP OFF 1149 THE PARAMETER LIST
6. DEFINITION IS 2201 1149
7. SEARCH FOR 1149 FILE AND SCAN FOR PARAMETERS. THERE ARE NONE
8. POP OFF 002F
9. DEFINITION IS 2201 1149 002F
10. SEARCH FOR 002F FILE AND SCAN FOR PARAMETERS. THERE ARE NONE
11. POP OFF 0035
12. DEFINITION IS 2201 1149 002F 0035
13. SEARCH FOR 0035 FILE AND SCAN FOR PARAMETERS.
14. PARAMETER LIST IS:
    1193, 1195, 1196, 112E, 2103, 2135, 1153, 2125, 11A0
15. POP OFF 1193
16. DEFINITION IS 2201 1149 002F 0035 1193
17. SEARCH FOR 1193 FILE AND SCAN FOR PARAMETERS. THERE ARE NONE
18. POP OFF 1195
19. DEFINITION IS 2201 1149 002F 0035 1193 1195
20. SEARCH FOR 1195 FILE AND SCAN FOR PARAMETERS. THERE ARE NONE
21. POP OFF 1196
22. DEFINITION IS 2201 1149 002F 0035 1193 1195 1196
23. SEARCH FOR 1196 FILE AND SCAN FOR PARAMETERS. THERE ARE NONE
24. POP OFF 112E
25. DEFINITION IS 2201 1149 002F 0035 1193 1195 1196 112E
26. SEARCH FOR 112E FILE AND SCAN FOR PARAMETERS. THERE ARE NONE
ETC. STEPS 24-26 ARE REPEATED FOR 2103, 2135, 1153, 2125, AND 11A0

DEFINITION IS:
2201 1149 002F 0035 1193 1195 1196 112E 2103 2135 1153 2125 11A0

FIG. 9
(PRIOR ART)

```
Retrieve definition for top level command
Scan definition file for top level command for parameters
    parameter_A, parameter_B etc...
LOOP Until All Elements are Processed
    Remove first element from parameter list
    SELECT
        Remove first element from parameter list
        CASE parameter_A:                             /*Subparameters of A */
            definition = definition + parameter_A
          CASE parameter_A.1:
              definition = definition + parameter_A.1
            CASE parameter_A.1.1:
                definition = definition + parameter_A.1.1
            CASE parameter_A.1.2:
                definition = definition + parameter_A.1.2
          CASE parameter_A.2:
              definition = definition + parameter_A.2
            CASE parameter_A.2.1:
                definition = definition + parameter_A.2.1
            CASE parameter_A.2.2:
                definition = definition + parameter_A.2.2
          CASE parameter_A.3:
              definition = definition + parameter_A.3
            CASE parameter_A.3.1:
              definition = definition + parameter_A.3.1
            CASE parameter_A.3.2:
              definition = definition + parameter_A.3.2
        CASE parameter_B:                             /*Subparameters of B */
            definition = definition + parameter_B
          CASE parameter_B.1:
              definition = definition + parameter_B.1
            CASE parameter_B.1.1:
                definition = definition + parameter_B.1.1
            CASE parameter_B.1.2:
                definition = definition + parameter_B.1.2
            CASE parameter_B.1.3:
                definition = definition + parameter_B.1.3
          CASE parameter_B.2:
              definition = definition + parameter_B.2
            CASE parameter_B.2.1:
                definition = definition + parameter_B.2.1
            CASE parameter_B.2.2:
                definition = definition + parameter_B.2.2
          CASE parameter_B.3:
              definition = definition + parameter_B.3
            CASE parameter_B.3.1:
              definition = definition + parameter_B.3.1
            CASE parameter_B.3.2:
              definition = definition + parameter_B.3.2
        etc...

ENDSELECT
end Loop;
RSM Method for Constructing Definition
```

FIG. 11
(PRIOR ART)
1. RETRIEVE DEFINITION FOR TOP LEVEL COMMAND, ACCRDBRM (2201)
2. SCAN ACCRDBRM FOR TOP LEVEL LIST OF PARAMETERS
   1149, 002F, 0035, 112E, 2103, 2135, 1153, 2125, 11A0
3. DEFINITION = 2201
4. CASE 1149, DEFINITION = 2201 1149
5. CASE 002F, DEFINITION = 2201 1149 002F
6. CASE 0035, DEFINITION = 2201 1149 002F 0035
7. CASE 1193, DEFINITION = 2201 1149 002F 0035 1193
8. CASE 1195, DEFINITION = 2201 1149 002F 0035 1193 1195
9. CASE 1196, DEFINITION = 2201 1149 002F 0035 1193 1195 1196
10. CASE 112E, DEFINITION = 2201 1149 002F 0035 1193 1195 1196 112E
11. CASE 2103, DEFINITION = 2201 1149 002F 0035 1193 1195 1196 112E 2103
12. CASE 2135,
    DEFINITION = 2201 1149 002F 0035 1193 1195 1196 112E 2103 2135
13. CASE 1153,
    DEFINITION = 2201 1149 002F 0035 1193 1195 1196 112E 2103 2135 1153
14. CASE 2125,
    DEFINITION =
          2201 1149 002F 0035 1193 1195 1196 112E 2103 2135 1153 2125
15. CASE 11A0,
    DEFINITION =
          2201 1149 002F 0035 1193 1195 1196 112E 2103 2135 1153 2125 11A0
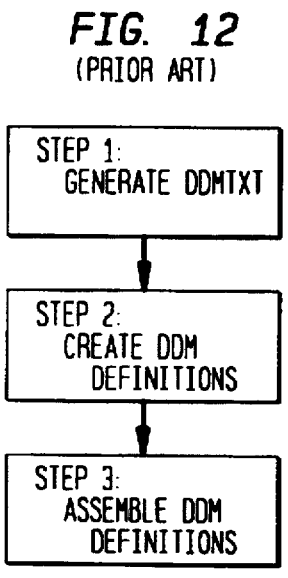
FIG. 12
(PRIOR ART)
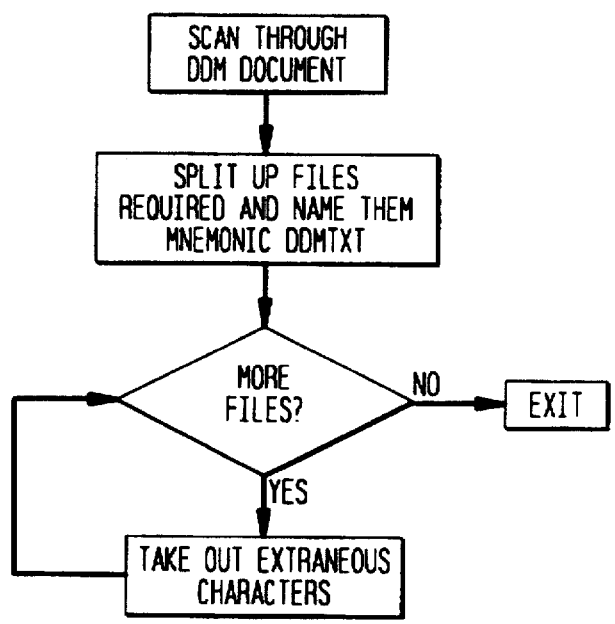
FIG. 13
(PRIOR ART)

FIG. 16
(PRIOR ART)

```
ADDG
   Generate_DDMTXT
   Create_DDM_Definitions
   Assemble_DDM_Definitions
end ADDG;

Generate_DDMTXT
   /* Scan through DDM Document */
   Do while not reached the end of the DDM Architecture Dictionary
      Scan for and split up next term definition into a file
      Remember codepoint and append to DDMFLVL file
   End /* Do While */;

Do while we have not processed all the files
      Take out extraneous characters from the file
   End /* Do While */;
end Generate_DDMTXT;

Create_DDM_Definitions
   Do while not done with all the files
      If the next file is the DDM root
      Then
         Do;
            Extract carrier, length information
            Write in definition BNF Carriers for Command Part (CP), Command
                  Data (CD), and Reply Data (RD) parts
         End;
      Else
         Do;
            Extract required/optional/ignorable information
                  repeatable/nonrepeatable
                  length information...
            Write in definition the attributes and codepoint
         End;
         Level = 1
         Do while there are parameters in the codepoint
            Obtain each parameter with attribute information
            add 1 to level
            write down definition for parameter in BNF form
         End /* Do while */;

end Create_DDM_Definitions;

Assemble_DDM_Definitions

Do while we have not processed all the root parameters
            /* do a depth first search */
            Form an empty queue consisting of the root node
            Do until queue is empty
               Remove first element from the queue
               Add the first element's children if any
                     to the front of the queue
            End /* Do until */
         End /* Do while */
end Assemble_DDM_Definitions;
```

FIG. 17A

```
DCL TBLBASE POINTER(31) INIT(ADDR(TABLE));
DCL TBL_PTR POINTER(31);
DCL 1 DDM_TBL BASED(TBL_PTR),
      2 SPEC  CHAR(6),
      2 LEN   FIXED(16),
      2 INDEX PTR(31);

DCL 1 TABLE STATIC,
      2 CDEXCSQLIMM,
          3 * CHAR(6)   INIT ('CD200A'),
          3 * FIXED(16) INIT(LENGTH(DCDEXCSQLIMM)),
          3 * PTR(31)   INIT(ADDR(DCDEXCSQLIMM)),
      2 CDEXCSQLSTT,
          3 * CHAR(6)   INIT ('CD200B'),
          3 * FIXED(16) INIT(LENGTH(DCDEXCSQLSTT)),
          3 * PTR(31)   INIT(ADDR(DCDEXCSQLSTT)),
      2 CDOPNQRY,
          3 * CHAR(6)   INIT ('CD200C'),
          3 * FIXED(16) INIT(LENGTH(DCDOPNQRY)),
          3 * PTR(31)   INIT(ADDR(DCDOPNQRY)),
      2 CDPRPSQLSTT,
          3 * CHAR(6)   INIT ('CD200D'),
          3 * FIXED(16) INIT(LENGTH(DCDPRPSQLSTT)),
          3 * PTR(31)   INIT(ADDR(DCDPRPSQLSTT)),
      2 CDBNDSQLSTT,
          3 * CHAR(6)   INIT ('CD2004'),
          3 * FIXED(16) INIT(LENGTH(DCDBNDSQLSTT)),
          3 * PTR(31)   INIT(ADDR(DCDBNDSQLSTT)),
      2 CDDSCRDBTBL,
          3 * CHAR(6)   INIT ('CD2012'),
          3 * FIXED(16) INIT(LENGTH(DCDDSCRDBTBL)),
          3 * PTR(31)   INIT(ADDR(DCDDSCRDBTBL)),
      2 CPEXCSAT,
          3 * CHAR(6)   INIT ('CP1041'),
          3 * FIXED(16) INIT(LENGTH(DCPEXCSAT)),
          3 * PTR(31)   INIT(ADDR(DCPEXCSAT)),
      2 CPCMDATHRM,
          3 * CHAR(6)   INIT ('CP121C'),
          3 * FIXED(16) INIT(LENGTH(DCPCMDATHRM)),
          3 * PTR(31)   INIT(ADDR(DCPCMDATHRM)),
      2 CPMGRLVLRM,
          3 * CHAR(6)   INIT ('CP1210'),
          3 * FIXED(16) INIT(LENGTH(DCPMGRLVLRM)),
          3 * PTR(31)   INIT(ADDR(DCPMGRLVLRM)),
      2 CPMGRDEPRM,
          3 * CHAR(6)   INIT ('CP1218'),
          3 * FIXED(16) INIT(LENGTH(DCPMGRDEPRM)),
          3 * PTR(31)   INIT(ADDR(DCPMGRDEPRM)),
      2 CPAGNPRMRM,
          3 * CHAR(6)   INIT ('CP1232'),
          3 * FIXED(16) INIT(LENGTH(DCPAGNPRMRM)),
          3 * PTR(31)   INIT(ADDR(DCPAGNPRMRM)),
```

FIG. 17B

```
2 CPRSCLMTRM,
  3 * CHAR(6) INIT ('CP1233'),
  3 * FIXED(16) INIT(LENGTH(DCPRSCLMTRM)),
  3 * PTR(31) INIT(ADDR(DCPRSCLMTRM)),
2 CPCMDCMPRM,
  3 * CHAR(6) INIT ('CP124B'),
  3 * FIXED(16) INIT(LENGTH(DCPCMDCMPRM)),
  3 * PTR(31) INIT(ADDR(DCPCMDCMPRM)),
2 CPSYNTAXRM,
  3 * CHAR(6) INIT ('CP124C'),
  3 * FIXED(16) INIT(LENGTH(DCPSYNTAXRM)),
  3 * PTR(31) INIT(ADDR(DCPSYNTAXRM)),
2 CPPRCCNVRM,
  3 * CHAR(6) INIT ('CP1245'),
  3 * FIXED(16) INIT(LENGTH(DCPPRCCNVRM)),
  3 * PTR(31) INIT(ADDR(DCPPRCCNVRM)),
2 CPTRGNSPRM,
  3 * CHAR(6) INIT ('CP125F'),
  3 * FIXED(16) INIT(LENGTH(DCPTRGNSPRM)),
  3 * PTR(31) INIT(ADDR(DCPTRGNSPRM)),
2 CPCMDNSPRM,
  3 * CHAR(6) INIT ('CP1250'),
  3 * FIXED(16) INIT(LENGTH(DCPCMDNSPRM)),
  3 * PTR(31) INIT(ADDR(DCPCMDNSPRM)),
2 CPPRMNSPRM,
  3 * CHAR(6) INIT ('CP1251'),
  3 * FIXED(16) INIT(LENGTH(DCPPRMNSPRM)),
  3 * PTR(31) INIT(ADDR(DCPPRMNSPRM)),
2 CPVALNSPRM,
  3 * CHAR(6) INIT ('CP1252'),
  3 * FIXED(16) INIT(LENGTH(DCPVALNSPRM)),
  3 * PTR(31) INIT(ADDR(DCPVALNSPRM)),
2 CPOBJNSPRM,
  3 * CHAR(6) INIT ('CP1253'),
  3 * FIXED(16) INIT(LENGTH(DCPOBJNSPRM)),
  3 * PTR(31) INIT(ADDR(DCPOBJNSPRM)),
2 CPCMDCHKRM,
  3 * CHAR(6) INIT ('CP1254'),
  3 * FIXED(16) INIT(LENGTH(DCPCMDCHKRM)),
  3 * PTR(31) INIT(ADDR(DCPCMDCHKRM)),
2 CPEXCSQLIMM,
  3 * CHAR(6) INIT ('CP200A'),
  3 * FIXED(16) INIT(LENGTH(DCPEXCSQLIMM)),
  3 * PTR(31) INIT(ADDR(DCPEXCSQLIMM)),
2 CPEXCSQLSTT,
  3 * CHAR(6) INIT ('CP200B'),
  3 * FIXED(16) INIT(LENGTH(DCPEXCSQLSTT)),
  3 * PTR(31) INIT(ADDR(DCPEXCSQLSTT)),
2 CPOPNQRY,
  3 * CHAR(6) INIT ('CP200C'),
  3 * FIXED(16) INIT(LENGTH(DCPOPNQRY)),
  3 * PTR(31) INIT(ADDR(DCPOPNQRY)),
```

FIG. 17C

```
2 CPPRPSQLSTT,
    3 * CHAR(6) INIT ('CP200D'),
    3 * FIXED(16) INIT(LENGTH(DCPPRPSQLSTT)),
    3 * PTR(31) INIT(ADDR(DCPPRPSQLSTT)),
2 CPRDBCMM,
    3 * CHAR(6) INIT ('CP200E'),
    3 * FIXED(16) INIT(LENGTH(DCPRDBCMM)),
    3 * PTR(31) INIT(ADDR(DCPRDBCMM)),
2 CPRDBRLLBCK,
    3 * CHAR(6) INIT ('CP200F'),
    3 * FIXED(16) INIT(LENGTH(DCPRDBRLLBCK)),
    3 * PTR(31) INIT(ADDR(DCPRDBRLLBCK)),
2 CPACCRDB,
    3 * CHAR(6) INIT ('CP2001'),
    3 * FIXED(16) INIT(LENGTH(DCPACCRDB)),
    3 * PTR(31) INIT(ADDR(DCPACCRDB)),
2 CPBGNBND,
    3 * CHAR(6) INIT ('CP2002'),
    3 * FIXED(16) INIT(LENGTH(DCPBGNBND)),
    3 * PTR(31) INIT(ADDR(DCPBGNBND)),
2 CPINTRDBROS,
    3 * CHAR(6), INIT ('CP2003'),
    3 * FIXED(16) INIT(LENGTH(DCPINTRDBROS)),
    3 * PTR(31) INIT(ADDR(DCPINTRDBROS)),
2 CPBNDSQLSTT,
    3 * CHAR(6) INIT ('CP2004'),
    3 * FIXED(16) INIT(LENGTH(DCPBNDSQLSTT)),
    3 * PTR(31) INIT(ADDR(DCPBNDSQLSTT)),
2 CPCLSQRY,
    3 * CHAR(6) INIT ('CP2005'),
    3 * FIXED(16) INIT(LENGTH(DCPCLSQRY)),
    3 * PTR(31) INIT(ADDR(DCPCLSQRY)),
2 CPCNTQRY,
    3 * CHAR(6) INIT ('CP2006'),
    3 * FIXED(16) INIT(LENGTH(DCPCNTQRY)),
    3 * PTR(31) INIT(ADDR(DCPCNTQRY)),
2 CPDRPPKG,
    3 * CHAR(6) INIT ('CP2007'),
    3 * FIXED(16) INIT(LENGTH(DCPDRPPKG)),
    3 * PTR(31) INIT(ADDR(DCPDRPPKG)),
2 CPDSCSQLSTT,
    3 * CHAR(6) INIT ('CP2008'),
    3 * FIXED(16) INIT(LENGTH(DCPDSCSQLSTT)),
    3 * PTR(31) INIT(ADDR(DCPDSCSQLSTT)),
2 CPENDBND,
    3 * CHAR(6) INIT ('CP2009'),
    3 * FIXED(16) INIT(LENGTH(DCPENDBND)),
    3 * PTR(31) INIT(ADDR(DCPENDBND)),
2 CPREBIND,
    3 * CHAR(6) INIT ('CP2010'),
    3 * FIXED(16) INIT(LENGTH(DCPREBIND)),
    3 * PTR(31) INIT(ADDR(DCPREBIND)),
```

FIG. 17D

```
2 CPDSCRDBTBL,
    3 * CHAR(6) INIT ('CP2012'),
    3 * FIXED(16) INIT(LENGTH(DCPDSCRDBTBL)),
    3 * PTR(31) INIT(ADDR(DCPDSCRDBTBL)),
2 CPDSCINVRM,
    3 * CHAR(6) INIT ('CP220A'),
    3 * FIXED(16) INIT(LENGTH(DCPDSCINVRM)),
    3 * PTR(31) INIT(ADDR(DCPDSCINVRM)),
2 CPENDORYRM,
    3 * CHAR(6) INIT ('CP220B'),
    3 * FIXED(16) INIT(LENGTH(DCPENDORYRM)),
    3 * PTR(31) INIT(ADDR(DCPENDORYRM)),
2 CPENDUOWRM,
    3 * CHAR(6) INIT ('CP220C'),
    3 * FIXED(16) INIT(LENGTH(DCPENDUOWRM)),
    3 * PTR(31) INIT(ADDR(DCPENDUOWRM)),
2 CPABNUOWRM,
    3 * CHAR(6) INIT ('CP220D'),
    3 * FIXED(16) INIT(LENGTH(DCPABNUOWRM)),
    3 * PTR(31) INIT(ADDR(DCPABNUOWRM)),
2 CPDTAMCHRM,
    3 * CHAR(6) INIT ('CP220E'),
    3 * FIXED(16) INIT(LENGTH(DCPDTAMCHRM)),
    3 * PTR(31) INIT(ADDR(DCPDTAMCHRM)),
2 CPQRYPOPRM,
    3 * CHAR(6) INIT ('CP220F'),
    3 * FIXED(16) INIT(LENGTH(DCPQRYPOPRM)),
    3 * PTR(31) INIT(ADDR(DCPQRYPOPRM)),
2 CPACCRDBRM,
    3 * CHAR(6) INIT ('CP2201'),
    3 * FIXED(16) INIT(LENGTH(DCPACCRDBRM)),
    3 * PTR(31) INIT(ADDR(DCPACCRDBRM)),
2 CPQRYNOPRM,
    3 * CHAR(6) INIT ('CP2202'),
    3 * FIXED(16) INIT(LENGTH(DCPQRYNOPRM)),
    3 * PTR(31) INIT(ADDR(DCPQRYNOPRM)),
2 CPRDBATHRM,
    3 * CHAR(6) INIT ('CP2203'),
    3 * FIXED(16) INIT(LENGTH(DCPRDBATHRM)),
    3 * PTR(31) INIT(ADDR(DCPRDBATHRM)),
2 CPRDBNACRM,
    3 * CHAR(6) INIT ('CP2204'),
    3 * FIXED(16) INIT(LENGTH(DCPRDBNACRM)),
    3 * PTR(31) INIT(ADDR(DCPRDBNACRM)),
2 CPOPNORYRM,
    3 * CHAR(6) INIT ('CP2205'),
    3 * FIXED(16) INIT(LENGTH(DCPOPNORYRM)),
    3 * PTR(31) INIT(ADDR(DCPOPNORYRM)),
2 CPPKGBNARM,
    3 * CHAR(6) INIT ('CP2206'),
    3 * FIXED(16) INIT(LENGTH(DCPPKGBNARM)),
    3 * PTR(31) INIT(ADDR(DCPPKGBNARM)),
```

FIG. 17E

```
2 CPRDBACCRM,
    3 * CHAR(6) INIT ('CP2207'),
    3 * FIXED(16) INIT(LENGTH(DCPRDBACCRM)),
    3 * PTR(31) INIT(ADDR(DCPRDBACCRM)),
2 CPBGNBNDRM,
    3 * CHAR(6) INIT ('CP2208'),
    3 * FIXED(16) INIT(LENGTH(DCPBGNBNDRM)),
    3 * PTR(31) INIT(ADDR(DCPBGNBNDRM)),
2 CPPKGBPARM,
    3 * CHAR(6) INIT ('CP2209'),
    3 * FIXED(16) INIT(LENGTH(DCPPKGBPARM)),
    3 * PTR(31) INIT(ADDR(DCPPKGBPARM)),
2 CPRDBNAVRM,
    3 * CHAR(6) INIT ('CP221A'),
    3 * FIXED(16) INIT(LENGTH(DCPRDBNAVRM)),
    3 * PTR(31) INIT(ADDR(DCPRDBNAVRM)),
2 CPINTTKNRM,
    3 * CHAR(6) INIT ('CP2210'),
    3 * FIXED(16) INIT(LENGTH(DCPINTTKNRM)),
    3 * PTR(31) INIT(ADDR(DCPINTTKNRM)),
2 CPRDBNFNRM,
    3 * CHAR(6), INIT ('CP2211'),
    3 * FIXED(16) INIT(LENGTH(DCPRDBNFNRM)),
    3 * PTR(31) INIT(ADDR(DCPRDBNFNRM)),
2 CPOPNQFLRM,
    3 * CHAR(6) INIT ('CP2212'),
    3 * FIXED(16) INIT(LENGTH(DCPOPNQFLRM)),
    3 * PTR(31) INIT(ADDR(DCPOPNQFLRM)),
2 CPSQLERRRM,
    3 * CHAR(6) INIT ('CP2213'),
    3 * FIXED(16) INIT(LENGTH(DCPSQLERRRM)),
    3 * PTR(31) INIT(ADDR(DCPSQLERRRM)),
2 RDEXCSAT,
    3 * CHAR(6) INIT ('RD1041'),
    3 * FIXED(16) INIT(LENGTH(DRDEXCSAT)),
    3 * PTR(31) INIT(ADDR(DRDEXCSAT)),
2 RDEXCSQLIMM,
    3 * CHAR(6) INIT ('RD200A'),
    3 * FIXED(16) INIT(LENGTH(DRDEXCSQLIMM)),
    3 * PTR(31) INIT(ADDR(DRDEXCSQLIMM)),
2 RDEXCSQLSTT,
    3 * CHAR(6) INIT ('RD2008'),
    3 * FIXED(16) INIT(LENGTH(DRDEXCSQLSTT)),
    3 * PTR(31) INIT(ADDR(DRDEXCSQLSTT)),
2 RDOPNQRY,
    3 * CHAR(6) INIT ('RD200C'),
    3 * FIXED(16) INIT(LENGTH(DRDOPNQRY)),
    3 * PTR(31) INIT(ADDR(DRDOPNQRY)),
2 RDPRPSQLSTT,
    3 * CHAR(6) INIT ('RD200D'),
    3 * FIXED(16) INIT(LENGTH(DRDPRPSQLSTT)),
    3 * PTR(31) INIT(ADDR(DRDPRPSQLSTT)),
```

FIG. 17F

```
2 RDRDBCMM,
  3 * CHAR(6) INIT ('RD200E'),
  3 * FIXED(16) INIT(LENGTH(DRDRDBCMM)),
  3 * PTR(31) INIT(ADDR(DRDRDBCMM)),
2 RDRDBRLLBCK,
  3 * CHAR(6) INIT ('RD200F'),
  3 * FIXED(16) INIT(LENGTH(DRDRDBRLLBCK)),
  3 * PTR(31) INIT(ADDR(DRDRDBRLLBCK)),
2 RDACCRDB,
  3 * CHAR(6) INIT ('RD2001'),
  3 * FIXED(16) INIT(LENGTH(DRDACCRDB)),
  3 * PTR(31) INIT(ADDR(DRDACCRDB)),
2 RDBGNBND,
  3 * CHAR(6) INIT ('RD2002'),
  3 * FIXED(16) INIT(LENGTH(DRDBGNBND)),
  3 * PTR(31) INIT(ADDR(DRDBGNBND)),
2 RDBNDSQLSTT,
  3 * CHAR(6) INIT ('RD2004'),
  3 * FIXED(16) INIT(LENGTH(DRDBNDSQLSTT)),
  3 * PTR(31) INIT(ADDR(DRDBNDSQLSTT)),
2 RDCLSQRY,
  3 * CHAR(6) INIT ('RD2005'),
  3 * FIXED(16) INIT(LENGTH(DRDCLSQRY)),
  3 * PTR(31) INIT(ADDR(DRDCLSQRY)),
2 RDCNTQRY,
  3 * CHAR(6) INIT ('RD2006'),
  3 * FIXED(16) INIT(LENGTH(DRDCNTQRY)),
  3 * PTR(31) INIT(ADDR(DRDCNTQRY)),
2 RDDRPPKG,
  3 * CHAR(6) INIT ('RD2007'),
  3 * FIXED(16) INIT(LENGTH(DRDDRPPKG)),
  3 * PTR(31) INIT(ADDR(DRDDRPPKG)),
2 RDDSCSQLSTT,
  3 * CHAR(6) INIT ('RD2008'),
  3 * FIXED(16) INIT(LENGTH(DRDDSCSQLSTT)),
  3 * PTR(31) INIT(ADDR(DRDDSCSQLSTT)),
2 RDENDBND,
  3 * CHAR(6) INIT ('RD2009'),
  3 * FIXED(16) INIT(LENGTH(DRDENDBND)),
  3 * PTR(31) INIT(ADDR(DRDENDBND)),
2 RDREBIND,
  3 * CHAR(6) INIT ('RD2010'),
  3 * FIXED(16) INIT(LENGTH(DRDREBIND)),
  3 * PTR(31) INIT(ADDR(DRDREBIND)),
2 RDDSCRDBTBL,
  3 * CHAR(6) INIT ('RD2012'),
  3 * FIXED(16) INIT(LENGTH(DRDDSCRDBTBL)),
  3 * PTR(31) INIT(ADDR(DRDDSCRDBTBL)),
```

FIG. 17G

```
DCL DCDEXCSQLIMM CHAR(32)
     INIT ('3,200A,****/RN2:2414,****,FDOCA$');
DCL DCDEXCSQLSTT CHAR(60)
     INIT ('3,200B,****/ON2:2412,****,FDOCA/RR3:0010,****/OR3:147A,***
*$');
DCL DCDOPNQRY CHAR(60)
     INIT ('3,200C,****/ON2:2412,****,FDOCA/RR3:0010,****/OR3:147A,***
*$');
DCL DCDPRPSQLSTT CHAR(32)
     INIT ('3,200D,****/RN2:2414,****,FDOCA$');
DCL DCDBNDSQLSTT CHAR(52)
     INIT ('3,2004,****/RN2:2414,****,FDOCA/ON2:2419,****,FDOCA$');
DCL DCDDSCRDBTBL CHAR(32)
     INIT ('3,2012,****/RN2:243E,*260,FDOCA$');
DCL DCPEXCSAT CHAR(96)
     INIT ('1,1041,****/IN2:115E,****/ON2:1404,****/ON2:1150,0004/ON2:
1147,*259/IN2:1160,****/IN2:115A,*259$');
DCL DCPCMDATHRM CHAR(54)
     INIT ('2,121C,****/RN2:1149,0006/ON2:2110,0022/ON2:1153,*259$');
DCL DCPMGRLVLRM CHAR(54)
     INIT ('2,1210,****/RN2:1149,0006/RN2:1404,****/ON2:1153,*259$');
DCL DCPMGRDEPRM CHAR(68)
     INIT ('2,1218,****/RN2:1149,0006/ON2:2110,0022/RN2:1198,0005/ON2:
1153,*259$');
DCL DCPAGNPRMRM CHAR(54)
     INIT ('2,1232,****/RN2:1149,0006/ON2:2110,0022/ON2:1153,*259$');
DCL DCPRSCLMTRM CHAR(110)
     INIT ('2,1233,****/RN2:1149,0006/ON2:2110,0022/ON2:112D,****/ON2:
111F,0006/ON2:112E,*012/ON2:1127,0008/ON2:1153,*259$');
DCL DCPCMDCMPRM CHAR(40)
     INIT ('2,124B,****/RN2:1149,0006/ON2:1153,*259$');
DCL DCPSYNTAXRM CHAR(82)
     INIT ('2,124C,****/RN2:1149,0006/RN2:114A,0005/ON2:000C,0006/ON2:
2110,0022/ON2:1153,*259$');
DCL DCPPRCCNVRM CHAR(68)
     INIT ('2,1245,****/RN2:1149,0006/RN2:113F,0005/ON2:2110,0022/ON2:
1153,*259$');
DCL DCPTRGNSPRM CHAR(54)
     INIT ('2,125F,****/RN2:1149,0006/ON2:2110,0022/ON2:1153,*259$');
DCL DCPCMDNSPRM CHAR(68)
     INIT ('2,1250,****/RN2:1149,0006/RN2:000C,0006/ON2:2110,0022/ON2:
1153,*259$');
DCL DCPPRMNSPRM CHAR(68)
     INIT ('2,1251,****/RN2:1149,0006/RN2:000C,0006/ON2:2110,0022/ON2:
1153,*259$');
DCL DCPVALNSPRM CHAR(68)
     INIT ('2,1252,****/RN2:1149,0006/RN2:000C,0006/ON2:2110,0022/ON2:
1153,*259$');
DCL DCPOBJNSPRM CHAR(68)
     INIT ('2,1253,****/RN2:1149,0006/RN2:000C,0006/ON2:2110,0022/ON2:
1153,*259$');
DCL DCPCMDCHKRM CHAR(68)
     INIT ('2,1254,****/RN2:1149,0006/RN2:115C,0005/ON2:2110,0022/ON2:
1153,*259$');
```

FIG. 17H

```
DCL DCPEXCSQLIMM CHAR(40)
    INIT ('1,200A,****/ON2:2110,0022/RN2:2113,0068$' );
DCL DCPEXCSQLSTT CHAR(54)
    INIT ('1,200B,****/ON2:2110,0022/RN2:2113,0068/ON2:2111,0005$' );
DCL DCPOPNQRY CHAR(68)
    INIT ('1,200C,****/ON2:2110,0022/RN2:2113,0068/RN2:2114,0008/ON2:
2132,0005$' );
DCL DCPPRPSQLSTT CHAR(54)
    INIT ('1,200D,****/ON2:2110,0022/RN2:2113,0068/ON2:2116,0005$' );
DCL DCPRDBCMM CHAR(26)
    INIT ('1,200E,****/ON2:2110,0022$' );
DCL DCPRDBRLLBCK CHAR(26)
    INIT ('1,200F,****/ON2:2110,0022$' );
DCL DCPINTRDBROS CHAR(40)
    INIT ('1,2003,****/RN2:2103,*259/ON2:2110,0022$' );
DCL DCPBNDSQLSTT CHAR(68)
    INIT ('1,2004,****/ON2:2110,0022/RN2:2113,0068/ON2:2117,0008/ON2:
2126,0006$' );
DCL DCPCLSQRY CHAR(40)
    INIT ('1,2005,****/ON2:2110,0022/RN2:2113,0068$' );
DCL DCPCNTQRY CHAR(54)
    INIT ('1,2006,****/ON2:2110,0022/RN2:2113,0068/RN2:2114,0008$' );
DCL DCPDRPPKG CHAR(54)
    INIT ('1,2007,****/ON2:2110,0022/RN2:210A,0058/ON2:1144,*258$' );
DCL DCPDSCSQLSTT CHAR(40)
    INIT ('1,2008,****/ON2:2110,0022/RN2:2113,0068$' );
DCL DCPENDBND CHAR(54)
    INIT ('1,2009,****/ON2:2110,0022/RN2:2112,0066/ON2:2127,0006$' );
DCL DCPDSCRDBTBL CHAR(40)
    INIT ('1,2012,****/ON2:2110,0022/ON2:2113,0068$' );
DCL DCPENDQRYRM CHAR(54)
    INIT ('2,220B,****/RN2:1149,0006/ON2:2110,0022/ON2:1153,*259$' );
DCL DCPENDUOWRM CHAR(68)
    INIT ('2,220C,****/RN2:1149,0006/RN2:2115,0005/ON2:2110,0022/ON2:
1153,*259$' );
DCL DCPABNUOWRM CHAR(54)
    INIT ('2,220D,****/RN2:1149,0006/ON2:2110,0022/ON2:1153,*259$' );
DCL DCPDTAMCHRM CHAR(54)
    INIT ('2,220E,****/RN2:1149,0006/ON2:2110,0022/ON2:1153,*259$' );
DCL DCPQRYPOPRM CHAR(68)
    INIT ('2,220F,****/RN2:1149,0006/RN2:2110,0022/RN2:2113,0068/ON2:
1153,*259$' );
DCL DCPQRYNOPRM CHAR(68)
    INIT ('2,2202,****/RN2:1149,0006/RN2:2110,0022/RN2:2113,0068/ON2:
1153,*259$' );
DCL DCPRDBATHRM CHAR(54)
    INIT ('2,2203,****/RN2:1149,0006/RN2:2110,0022/ON2:1153,*259$' );
DCL DCPRDBNACRM CHAR(54)
    INIT ('2,2204,****/RN2:1149,0006/RN2:2110,0022/ON2:1153,*259$' );
DCL DCPOPNQRYRM CHAR(68)
    INIT ('2,2205,****/RN2:1149,0006/RN2:2102,0006/ON2:211F,0005/ON2:
1153,*259$' );
```

FIG. 17I

```
DCL DCPPKGBNARM CHAR(54)
    INIT (' 2, 2206, ****/RN2: 1149, 0006/RN2: 2110, 0022/ON2: 1153, *259$' );
DCL DCPRDBACCRM CHAR(54)
    INIT (' 2, 2207, ****/RN2: 1149, 0006/RN2: 2110, 0022/ON2: 1153, *259$' );
DCL DCPBGNBNDRM CHAR(82)
    INIT (' 2, 2208, ****/RN2: 1149, 0006/RN2: 2110, 0022/RN2: 2112, 0066/RN2:
1144, *258/ON2: 1153, 259$' );
DCL DCPPKGBPARM CHAR(54)
    INIT (' 2, 2209, ****/RN2: 1149, 0006/RN2: 2110, 0022/ON2: 1153, *259$' );
DCL DCPRDBNAVRM CHAR(54)
    INIT (' 2, 221A, ****/RN2: 1149, 0006/RN2: 2110, 0022/ON2: 1153, *259$' );
DCL DCPINTTKNRM CHAR(68)
    INIT (' 2, 2210, ****/RN2: 1149, 0006/RN2: 2110, 0022/RN2: 2103, *259/ON2:
1153, *259$' );
DCL DCPRDBNFNRM CHAR(54)
    INIT (' 2, 2211, ****/RN2: 1149, 0006/RN2: 2110, 0022/ON2: 1153, *259$' );
DCL DCPOPNOFLRM CHAR(54)
    INIT (' 2, 2212, ****/RN2: 1149, 0006/RN2: 2110, 0022/ON2: 1153, *259$' );
DCL DCPSQLERRRM CHAR(54)
    INIT (' 2, 2213, ****/RN2: 1149, 0006/ON2: 2110, 0022/ON2: 1153, *259$' );
DCL DRDEXCSAT CHAR(96)
    INIT (' 3, 1041, ****/RN2: 1443, ****/ON3: 115E, ****/ON3: 1404, ****/ON3:
1147, *259/ON3: 116D, ****/ON3: 115A, *259$' );
DCL DRDACCRDB CHAR(32)
    INIT (' 3, 2001, ****/RN2: 2408, ****, FDOCA$' );
DCL DRDEXCSQLIMM CHAR(32)
    INIT (' 3, 200A, ****/RN2: 2408, ****, FDOCA$' );
DCL DRDEXCSQLSTT CHAR(80)
    INIT (' 3, 200B, ****/ON2: 2408, ****, FDOCA/ON2: 2413, ****, FDOCA/RR3: 00
10, ****/OR3: 147A, ****$' );
DCL DRDOPNQRY CHAR(66)
    INIT (' 3, 200C, ****/ON2: 2408, ****, FDOCA/OR2: 241A, ****, FDOCA/OR2: 24
1B, ****$' );
DCL DRDPRPSQLSTT CHAR(52)
    INIT (' 3, 200D, ****/ON2: 2411, ****, FDOCA/ON2: 2408, ****, FDOCA$' );
DCL DRDRDBCMM CHAR(32)
    INIT (' 3, 200E, ****/RN2: 2408, ****, FDOCA$' );
DCL DRDRDBRLLBCK CHAR(32)
    INIT (' 3, 200F, ****/RN2: 2408, ****, FDOCA$' );
DCL DRDBGNBND CHAR(32)
    INIT (' 3, 2002, ****/RN2: 2408, ****, FDOCA$' );
DCL DRDBNDSQLSTT CHAR(32)
    INIT (' 3, 2004, ****/RN2: 2408, ****, FDOCA$' );
DCL DRDCLSQRY CHAR(32)
    INIT (' 3, 2005, ****/RN2: 2408, ****, FDOCA$' );
DCL DRDCNTQRY CHAR(46)
    INIT (' 3, 2006, ****/ON2: 2408, ****, FDOCA/OR2: 241B, ****$' );
DCL DRDDRPPKG CHAR(32)
    INIT (' 3, 2007, ****/RN2: 2408, ****, FDOCA$' );
DCL DRDDSCSQLSTT CHAR(52)
    INIT (' 3, 2008, ****/RN2: 2411, ****, FDOCA/ON2: 2408, ****, FDOCA$' );
DCL DRDENDBND CHAR(32)
    INIT (' 3, 2009, ****/RN2: 2408, ****, FDOCA$' );
```

FIG. 17J

```
DCL DRDREBIND CHAR(32)
    INIT (' 3, 2010, ****/RN2: 2408, ****, FDOCAS' );
DCL DRDDSCROBTBL CHAR(52)
    INIT (' 3, 2012, ****/RN2: 2411, ****, FDOCA/ON2: 2408, ****, FDOCAS' );

DCL DCPACCROB CHAR(208)
    INIT (' 1, 2001, ****/RN2: 2110, 0022/RN2: 210F, 0006/RN2: 002F, ****/ON2:
0035, ****/ON3: 1193, 0006/ON3: 1195, 0006/ON3: 1196, 0006/RN2: 112E, *012/ON2: 2
11A, 0005/ON2: 2104, ****/ON2: 2121, 0006/ON2: 2120, 0006/ON2: 2135, *259/ON2: 21
3B, 0005$' );

DCL 1 DCPBGNBND STATIC,
    2 * CHAR(250)
        INIT (' 1, 2002, ****/ON2: 2110, 0022/RN2: 2112, 0066/ON2: 1144, *258/ON
2: 211D, 0006/ON2: 211B, 0006/ON2: 211C, 0006/ON2: 211E, 0006/ON2: 2120, 0006/ON2
: 2121, 0006/ON2: 2122, 0006/ON2: 2123, 0006/RN2: 2124, 0006/ON2: 2125, 0006/ON2:
2132, 0006/ON2: 2106, 0006/ON2: 119A, ****/ON3: 119C, 0006/' ),
    2 * CHAR(98)
        INIT (' ON3: 119D, 0006/ON3: 119E, 0006/ON2: 2129, 0006/ON2: 2130, 0006/
ON2: 2131, *012/ON2: 2128, *022/IN2: 0045, *259$' );
DCL DCPREBIND CHAR(138)
    INIT (' 1, 2010, ****/ON2: 2110, 0022/RN2: 210A, 0058/ON2: 1144, *258/ON2:
2124, 0006/ON2: 2130, 0006/ON2: 2131, *012/ON2: 2129, 0006/ON2: 2118, 0006/ON2: 2
128, *022$' );
DCL DCPDSCINVRM CHAR(124)
    INIT (' 2, 220A, ****/RN2: 1149, 0006/RN2: 2101, 0005/RN2: 2110, 0022/RN2:
0010, ****/RN2: 2118, 0008/RN2: 212A, 0008/RN2: 212B, 0006/ON2: 1153, *259$' );
DCL DCPACCRDBRM CHAR(180)
    INIT (' 2, 2201, ****/RN2: 1149, 0006/RN2: 002F, ****/ON2: 0035, ****/ON3:
1193, 0006/ON3: 1195, 0006/ON3: 1196, 0006/RN2: 112E, *012/ON2: 2103, *259/ON2: 2
135, *259/ON2: 1153, *259/ON2: 2125, 0006/ON2: 11A0, *259$' );
```

FIG. 17L

```
/******************************************************************/
/*   COPY THE DEFINITION INTO THE BUFFER AREA                     */
/******************************************************************/
    IF FOUND THEN
        DO;
        CALL ARITAMC (DEFBUFPT, DEFNPT, EXPLEN, DRRMPT);
        DEFBUFPT = ADDR(BUF);
        END;
/******************************************************************/
/*   ELSE SET RETURN CODE TO NOT FOUND. CALLER WILL INVOKE        */
/*   APPROPRIATE ERROR ROUTINES.                                  */
/******************************************************************/
    ELSE
        DO;
        ARICODE = CPTNTFND;      /* CODEPOINT NOT FOUND           */
        END;
EXIT:
    RETURN CODE(ARICODE);        /* RETURN THE CODE               */
```

FIG. 17K

```
CHRPSCPT(1::2) = PARTSPEC;      /* PARTSPEC INTO FIRST TWO POS.  */
CHRPSCPT(3::4) = CHRCODEP;      /* CPT INTO LAST FOUR POSITIONS  */
/*****************************************************************/
/* INITIALIZE CONTROL VARIABLES                                  */
/*****************************************************************/
   FOUND = OFF;
   ARICODE= OK;
/*****************************************************************/
/* DO A BINARY SEARCH THROUGH THE TABLE.                         */
/*****************************************************************/
   TOP = TABSIZE;
   BOTTOM = 1;
   DO WHILE (BOTTOM =< TOP) UNTIL (FOUND);
     MIDDLE = ((TOP + BOTTOM)/2);
     TBL_PTR=TBLBASE+((MIDDLE-1)*12);
     IF SPEC = CHRPSCPT THEN
       DO;
       /*****************************************************************/
       /* WE FOUND A CODEPOINT. SET UP FOR MOVING THE DEFINITION         */
       /* LATER INTO THE BUFFER.                                         */
       /*****************************************************************/
       FOUND = ON;
       DEFNPT = INDEX;
       EXPLEN = LEN;
     END;
     ELSE
     DO;
       IF SPEC > CHRPSCPT THEN
         TOP = MIDDLE - 1;
       ELSE
         BOTTOM = MIDDLE + 1;
     END;
   END;
```

FIG. 22

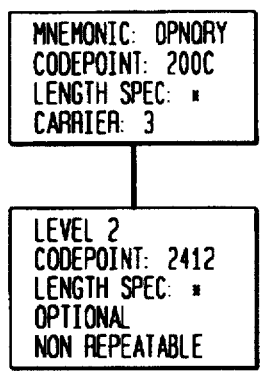

FIG. 19

```
LINE  1:  DDM_ENTRY ::= CARRIER ',' CODEPT ',' 'LENGTH' ',' DDM_PARM$
LINE  2:            |  CARRIER ',' CODEPT ',' 'LENGTH' ',' LOWERA$
LINE  3:            |  CARRIER ',' CODEPT ',' 'LENGTH' ',' 'LOWERA' LOWOBJ

LINE  4:  DDM_PARMS ::=      '/' ROI AN LEVEL ',' CODEPT ',' LENGTH ','
LINE  5:                  |  '/' ROI AN LEVEL ',' CODEPT ',' LENGTH ','
LINE  6:                     'LOWERA'
LINE  7:                  |  DDM_PARMS DDM_PARMS
LINE  8:                  |  DDM_PARMS '$'

LINE  9:  LOWOBJ ::=    '/' ROI AN LEVEL ',' CODEPT ',' LENGTH
LINE 10:              |  LOWOBJ LOWOBJ
LINE 11:              |  LOWOBJ '$'

LINE 12:  CARRIER ::= '0' | '1' | '2' | '3'
LINE 13:  LEVEL   ::= X WHERE X > 0
LINE 14:  CODEPT  ::= ANY DDM CODEPOINT
LINE 15:  LENGTH  ::= DDDD | '****' | 'MAXLEN | MINLEN ','
LINE 16:  MAXLEN  ::= ANY POSITIVE NUMBER
LINE 17:  MINLEN  ::= ANY POSITIVE NUMBER
LINE 18:  ROI     ::= 'R' | '0' | 'I'
LINE 19:  AN      ::= 'R' | 'N'
LINE 20:  D       ::= ANY DIGIT FROM 0 TO 9
```

*> DDM_ENTRY DESCRIBES THE TOP LEVEL DDM COMMAND OR REPLY MESSAGE. THIS ENTRY IS USED TO DESCRIBE THE CARRIER DATA STREAM STRUCTURE, AND ALSO ALLOWS THE OBJECT TO BE A DDM OBJECT OR LOWERA OBJECT DIRECTLY.

*> THIS DESCRIBES THE DDM_PARM TERM. FOR EXAMPLE, WHETHER IT IS REQUIRED, OPTIONAL OR IGNORABLE. IT ALSO DESCRIBES THE LENGTH OF THE OBJECT AND CAN BE COMPOSED OF MORE DDM_PARM OBJECTS, OR A LOWER ARCHITECTURE OBJECT.

*> THIS DESCRIBES A LOWER LEVEL TERM. THAT TERM IS COMPOSED OF ONE OR MORE LOWER LEVEL TERMS, OR A SIMPLE LOWER LEVEL OBJECT.

** MEANS ACCESS TO THE DDM DICTIONARY

DICTIONARY FOR ENCODING AND RETRIEVING HIERARCHICAL DATA PROCESSING INFORMATION FOR A COMPUTER SYSTEM

This application is a continuation of U.S. application Ser. No. 08/487,298, filed Jun. 7, 1995 now abandoned, which is a division of U.S. application Ser. No. 07/853,062, filed Mar. 17, 1992 which is now U.S. Pat. No. 5,632,031.

FIELD OF THE INVENTION

This invention relates to data processing and storage systems and in particular to methods and means for specifying the syntax of a hierarchical language for use in data transmissions of such systems.

BACKGROUND OF THE INVENTION

Data processing, for instance distributed processing, requires a connection protocol that defines specific flows, and interactions. These flows and interactions convey the intent and results of distributed processing requests. The protocol is necessary for semantic connectivity between applications and processors in a distributed environment. The protocol must define the responsibilities between the participants and specify when flows should occur and their contents. Distributed applications allow operations to be processed over a network of cooperating processors.

Clients and servers send information between each other using that set of protocols. These protocols define the order in which messages can be sent and received, the data that accompanies the messages, remote processor connection flows, and the means for converting data that is received from foreign environments.

The client provides the connection between the application and the servers via protocols. It supports the application end of the connection by: (1) Initiating a remote connection (2) Translating requests from the application into the standardized format, otherwise known as generating, (3) Translating replies from standardized formats into the application format, otherwise known as parsing, (4) Disconnecting the link from the remote processor when the application terminates or when it switches processors.

The server responds to requests received from the client. It supports the server end of the connection by: (1) Accepting a connection (2) Receiving input requests and data and converting them to its own internal format (parsing), (3) Constructing (generating) and sending standardized reply messages and data.

In particular, a distributed data processing architecture can use the Distributed Data Management Architecture (DDM) for providing the standardized format of the messages. DDM provides the conceptual framework for constructing common interfaces for command and reply interchange between a client and a server. Most DDM commands have internal statement counterparts.

DEFINITIONS

The following definitions are provided to assist in understanding the invention described below. Additional information may be found in the manual, "IBM Distributed Data Management Architecture Level 3: Reference, SC21-9526".

DSS (Data Stream Structure): DDM can be viewed as a multi-layer architecture for communicating data management requests between servers located on different data processing systems. All information is exchanged in the form of objects mapped onto a data stream appropriate to communication facilities being used by DDM. A data stream structure is a set of bytes which contains, among others, information about whether the enclosed structure is a request, reply, or data (an object structure); whether the structure is chained to other structures; etc. There are three general types of DDM data stream structures: "request structures" (RQSDSS) which are used for all requests to a target system for processing; "reply structures" ( RPYDSS ) which are used for all replies from a target system to a source system regarding the conditions detected during the processing of the request; and "object structures" (OBJDSS) which are used for all objects sent between systems.

Mnemonic: specifies a short form of the full name of a DDM object.

Class: describes a set of objects that have a common structure and respond to the same commands.

Codepoint: A codepoint (code point) specifies the data representation of a dictionary class. Codepoints are hexadecimal synonyms for the named terms of the DDM architecture. Codepoints are used to reduce the number of bytes required to identify the class of an object in memory and in data streams.

Command: Commands are messages sent to a server to request the execution of a function by that server; For example, the command "Get_Record" can be sent to a file system. Each DDM command normally returns (results in the sending of) one or more reply messages or data objects.

DDM commands can be described under four headings:

1. Description: The description part usually includes, a Command Name, or the mnemonic name of the command, such as "OPNQRY"; and an Expanded Name, such as "Open Query", that is a description of the command function.

2. Parameters: The parameters or instance variables describe the objects that can (or must be) sent as parameters of the command. The parameters can be sent in any order because they are identified by their class codepoints. The parameters are generally associated with a set of attributes (characteristics):

(a) required, optional, or ignorable

A Required attribute specifies that support or use of a parameter is required: when a parameter is specified as being required in a parameter list for a command, the parameter must be sent for that command. All receivers supporting the command must recognize and process the parameter as defined. When specified in the parameter list of a reply message, the parameter must be sent for that reply message. All receivers must accept the parameter. An Optional attribute specifies that support or use of a parameter is optional. When a parameter is specified as being optional in a parameter list for a command, the parameter can optionally be sent for that command. All receivers supporting the command must recognize and process the parameter as defined and use the default value if it is not sent. When specified in the parameter list of a reply message, the parameter can optionally be sent for that reply message. All receivers must accept the parameter. An Ignorable attribute specifies that a parameter can be ignored by the receiver of a command if the receiver does not provide the support requested. The parameter can be sent optionally by all senders. The parameter must be recognized by all receivers. The receiver is not required to support the architected default value and does not have to validate the specified value;

(b) Repeatable or Not Repeatable

A Repeatable attribute specifies that a parameter can be repeated in the value of the object variable being described. There are no requirements that the elements of the list be unique or that the elements of the list be in any order;

(c) Length characteristic

This describes the length requirements or restrictions of the corresponding data transmission.

3. Command Data: the list of all the possible classes of data objects (for example, records) that can be associated with the command. Each data object is generally associated with a set of attributes (characteristics), as are the parameters.

4. Reply Data: The reply data section lists all possible classes of data objects that can be returned for the command. The list may contain notes about selecting the data objects to return. The reply data objects that are normally returned for the command. When exception conditions occur, the reply data objects may not be returned, instead reply messages may return a description of the exception conditions.

All DDM commands may be enclosed in a RQSDSS before transmission:

RQSDSS(command(command parameters))

All DDM command data objects and reply data objects may be enclosed in an OBJDSS structure for transmission.

OBJDSS(command-data-object(object parameters))
OBJDSS(reply-data-object(object parameters))

All DDM command replies may be enclosed in a RPYDSS structure for transmission:

RPYDSS(command-reply(reply parameters))

Parsing: the process of verifying syntactic correctness of a DDM string (DDM stream), and of translating it into a recognizable internal format.

Generation: the process of creating a valid DDM string from an internal format.

Tree: A tree structure is either: (a) an empty structure, or (b) a node with a number of subtrees which are acyclic tree structures. A node y which is directly below node x is called a direct descendent of x; if x is at level i and y is at level i+1 the x is the parent of y and y is the child of x. Also, x is said to be an ancestor of y. The root of the tree is the only node in the tree with no parent. If a node has no descendents it is called a terminal node or a leaf. A node which is not a terminal node nor a root node is an internal node.

DDM Architecture Dictionary: The architecture dictionary describes a set of named descriptions of objects. The primary objects listed in the dictionary are broken down into the classes "CLASS" and "HELP". Each of these objects has an external name and an external codepoint that can be used to locate it. These are complex objects (nested collections of many subobjects). The entries in a dictionary are of varying length and each contains a single complete object. For scalar objects, all of the data of the object immediately follows the length and class codepoint of the object. For collection objects, the data following the length and class codepoint of the collection consists of four byte binary numbers specifying the entry number in the dictionary at which the collection is stored. The DDM Architecture Dictionary is also referred to as the DDM Architecture document.

DDM Architecture: The DDM architecture is fully described by the DDM Architecture Dictionary.

Forest: A grouping of trees.

Parameter: There are three kinds of DDM objects, as shown in FIG. 1.

First there are simple scalars which contain only a single instance of one of the DDM data classes, such as a single number or a single character string. DDM attributes, such as length, alignment and scale are simple scalars.

Then, there are mapped scalars which contain a sequence of instances of the DDM data classes that are mapped onto a byte stream by an external descriptor that specifies their class identifier and other attributes.

Finally, there are collections which contain a sequence of scalar and collection objects. DDM commands, reply messages, and attribute lists are all examples of collection objects.

All objects (including parameters) are transmitted as a contiguous string of bytes with the following format:

(a) a two byte binary length. The length field of an object always includes the length of the length field and the length of the codepoint field, as well as the length of the object's data value;

(b) a two byte binary value that specifies the codepoint of the class that describes the object. All objects are instances of the "CLASS" object that specifies the variables of the object, specifies the commands to which the object can respond, and provides the programming to respond to messages;

(c) an object's data area consists of the data value of primitive classes of objects, such as numbers and character strings, or the element objects of a collection.

A parameter can be either a scalar or a collection.

Since the class of a DDM object describes its parameters, it thereby defines the interchange data stream form, as shown in FIG. 2. This makes it possible to transmit a command consisting of multiple scalar parameters from one manager to another.

Definition: A definition as used in reference to data processing structures and operations described herein is the association of a name with an attribute list. Definitions are used to specify the characteristics of variables, values and other aspects of objects.

Database Management System (DBMS): A software system that has a catalog describing the data it manages. It controls the access to data stored within it. The DBMS also has transaction management and data recovery facilities to protect data integrity.

SQL (Structured Query Language): A language used in database management systems to access data in the database.

Depth First Search: is a means of systematically visiting nodes in a tree. The order is as follows: (1) Visit the root node; (2) Visit the children of the root node; (3) To visit a child, chose its children and visit them in turn. In general, other alternatives at the same level or below are ignored as long as the current node that is being visited is not a terminal node. One way to implement depth-first search is depicted in FIG. 3.

The corresponding pseudo-code is:

1. Form a one element queue consisting of the root node.
2. Until the queue is empty, remove the first element from the queue and add the first element's children, if any, to the front of the queue.

Other types of searches are possible, such as breadth-first search, which expands the nodes in order of their proximity to the start node, measured by the number of arcs between them.

Application Requester(AR): the source of a request to a remote relational database management system (DBMS). The AR is considered a client.

Application Server(AS): the target of a request from an AR. The DBMS at the AS site provides the data. The AS is considered a server.

Description of the IBM Distributed Data Management (DDM) Language

The Distributed Data Management (DDM) Architecture (as described in the IBM publication, "IBM Distributed Data Management Architecture Level 3: Reference, SC21-9526") describes a standardized language for Distributed Applications. This language is used by the data management components of existing systems to request data services from one another. It manipulates data interchange amongst different kinds of currently existing systems; efficient data interchange amongst systems of the same kind; common data management facilities for new systems; and evolution of new forms of data management. DDM provides the abstract models necessary for bridging the gap between disparate real operating system implementations. Some of the services addressed by the DDM distributed database models are to (a) establish a connection with a remote database;

(b) create application specific access methods (packages) in the database or dropping them from the database. These packages include the definitions of application variables used for input and output of SQL statements defined by the Application Requester;

(c) retrieve descriptions of answer set data;

(d) execute SQL statements bound in a database package;

(e) dynamically prepare and execute SQL statements in the database;

(f) maintain consistent unit of work boundaries between the application requester and the database;

(g) terminate the connection with the database.

Specification of DDM Objects

The DDM Architecture is defined by a "dictionary" of terms that describe the concepts, structures, and protocols of DDM. DDM entities are called objects. They are also synonymously called terms. See FIGS. 4a and 4b for a sample DDM Object. The object drawn is EXCSATRD (Exchange Server Attributes Reply Data). In order to obtain more information about the object EXCSATRD, one should look at the objects that form EXCSATRD. For example, the objects EXTNAM, MGRLVLLS, SRVCLSNM, SRVNAM and SRVRLSLV, which constitute the parameters of EXCSATRD are themselves DDM objects and can be found elsewhere in the architecture (architecture dictionary) in alphabetical order. Every object has a help variable. This variable is for supplemental information and explains the purpose and the semantics of the object. Another example of a DDM Command as documented in the DDM architecture reference, above is depicted in FIGS. 5a, and 5b.

Like object-oriented languages, DDM has three characteristics that make it object-oriented. These are encapsulation, inheritance, and polymorphism.

Encapsulation is a technique for minimizing interdependencies amongst separately written objects by defining strict external interfaces. DDM uses this concept to define each object class (an instance of which is an object) that is part of the architecture. Most of the DDM object classes have the following attributes: inscmd (instance commands), clscmd (class commands), insvar (instance variables), clsvar (class instance variables). In addition, there are other attributes, namely length and class.

Length indicates length or size of the object. There are two length attributes associated with most objects: one is the abstract length referring to the fact that if the entire object class were to be transmitted, including help text, it would be as long as the value specified with the attribute. This is always "*", where "*" represents a indefinite length due to its abstract nature. The second length attribute is a part of the instance variable list. It specifies the length of the object when it is transmitted as part of the protocol. The length of some objects is clear (fixed) at the time of definition. Most objects however, have variable lengths which are determined depending on their use. Thus, these objects have their lengths available only at the time of transmission of the objects.

Class indicates the class name or codepoint. Each object class has a name which briefly describes its type. Each object class also has a codepoint which is an alternate and more efficient (for transmission) way of naming it. This attribute is specified twice for every DDM object class, first as a brief description and then, as part of the instance variable list (as a hexadecimal number). There are some DDM objects which are not self-describing, when they are transmitted. That is, when these object are transmitted they are recognized by the receiver from the context; the length and the codepoint which are essential for the recognition of the object by the receiver are not transmitted even though these attributes are defined for these objects by DDM. The second characteristic, Inheritance is a technique that allows new, more specialized classes to be built from the existing classes. DDM uses the inheritance structure to encourage the reusability of the definition (and eventually of the code, if the implementation is object-oriented). The class COMMAND for example, is the superclass of all commands. From the superclass, the subclass inherits its structure. The third characteristic, Polymorphism is a technique that allows the same command to be understood by different objects, which respond differently.

In this disclosure, the following will be used:

N: the number of terms in the dictionary (number of trees), m: the number of total nodes in the expansion of a DDM command or reply message (number of nodes in a tree;

k: number of top level nodes, approximately N/10 in the specific application described herein;

j: average number of children per node.

Other Methods

This section describes other methods of hierarchical language storage and retrieval methodologies, including Loosely Coupled Files (LCF) and Root Storage Method (RSM).

Loosely Coupled Files (LCF)

Given that the DDM model isolates dictionaries from processing, LCF design represents t he DDM dictionaries by a collection of static data structures, which may be generated by macros. Each DDM Dictionary is assembled and link-edited into separate load modules. Isolation of DDM objects requires as search arguments, (a) the object name (character string) and (b) the dictionary identification. The dictionaries closely resemble the structure of the DDM documentation i.e., comprising a network of nodes. Thus, if one is familiar with the DDM documentation, one may correlate DDM concepts (scalars, collections, codepoints) to the LCF DDM Dictionaries.

LCF Retrieval Methodology

Since but a single definition of each DDM object exists, the requirement to generate the object or to recognize its existence is dependent upon that single definition. Thus, LCF creates generation and parsing methods which are driven entirely by the DDM dictionaries. Any DDM object to be generated first isolates the object definition within the appropriate dictionary. Then, it "pushes" the length and codepoint attributes onto a stack if the object is a collection and proceeds recursively through all the instance variables of the collection, halting when a scalar (leaf or terminal node) is encountered. When a scalar (terminal node) is reached, a generator routine is invoked, which "pushes" the scalar length, codepoint as well as the scalar value onto the stack. The length is returned to the invoker at the higher level. In this fashion, when all instance variables of a collection have been processed, the length of the collection is the sum of the lengths returned from the individual invocations. The example below depicts the LCF pseudo-code for building the definition at run-time. Note that recursion is used. Another way is depicted in FIG. 6 without recursion (i.e., recursion is simulated).

EXAMPLE

```
Newdef LCF_Construct (IN Codepoint)
  (*LCF Method for constructing Definition*)
  Search for the file identified by the Codepoint
  Scan for all its parameters (or instance variables),
    if any
  If There Are Some Then
    Do;
      Scan file for instance variables
      Do for all the Instance Variables
        Definition = Definition +
          LCF_Construct (Codepoint)
      End Do;
    End If;
End LCF₁₃Construct;
```

To illustrate the LCF flow and provide some insight with regard to the impact of Dictionary access and recursion on path length consider the example illustrated in FIG. 7 which depicts the definition tree to be built. LCF maintains 13 files for this tree. To illustrate the LCF flow and provide some insight with regard to the impact of Dictionary access and recursion on path length consider the example as depicted in FIG. 8.

Hence LCF retrieves each file, sequentially searches for parameters in each file (the search argument is a variable length character string, or DDM Mnemonic, such as RDB-NAM in the example above), and then for each parameter found, gets the file and extracts its parameters. This is a recursive method. This recursive step is done at run time, each time one wants to generate or parse a DDM stream. This means that the methods to construct a DDM Dictionary definition is an exhaustive search that goes through the entire file: Hence, in order to build the definition, LCF requires m retrievals and with each retrieval there is a sequential search to locate the parameters.

LCF Storage Methodology

LCF stores each DDM definition in a file, in the format shown in FIGS. 5a and 5b. This means that each term is stored in a separate file with information that is not needed by the parsing and generation processes. Also each of its instance variables are stored in the same fashion, etc.

The storage requirements for LCF are approximately 1000+100 m bytes per term in the dictionary, i.e., assuming 1000 bytes head and tail overhead plus 100 bytes per internal node. Hence, the storage requirements for the entire dictionary are approximately: (1000+100 m) N.

Root Storage Method

The Root Storage Method (RSM) approximates or simulates the recursion aspects of DDM object definition construction by an appropriate implementation technique (nested CASE statements, CASE within CASE within CASE). Given this direction, the objects defined within the DDM dictionaries can be entirely eliminated or restricted to objects of a given type. RSM restructures the DDM Dictionaries by first eliminating the dictionary identifier as an element in the search argument, and hence all dictionaries are merged together. Then, the dictionary search arguments are changed from character strings to codepoints. The character strings are still maintained within the dictionary. Finally, objects defined within the dictionaries are restricted to root nodes only. Thus, only DDM commands, command data, reply messages and reply data are defined. However, the constituent instance variables of any given DSS (or parameters), collection or scalar are not defined.

RSM Retrieval Methodology

Once the object has been identified to satisfy a request, then for each root level object, a unique root level object generator exists, which will generate one complete object. The object generator non-recursively constructs the instance variables (collections and scalars) which constitute the object. Consequently, the Generator must simulate the recursion inherent in the generation of all instance variables comprising that object. FIG. 9 depicts the CASE within CASE method. FIG. 10 depicts the flowchart of RSM object construction. With this approach, the DDM dictionaries are partitioned such that objects are defined within static data structures and the constituent instance variables are hard-coded. Note that in this method, the definitions of the various parameters are hardcoded multiple times, and that this method is not extendible to all possible variations of DDM. For example, it has the limitation in the number of levels of nesting that CASE statements are allowed.

To construct the definition for ACCRDBRM (as depicted in FIG. 7), RSM undertakes the steps depicted in FIG. 11.

To construct a definition, one must execute one retrieval with cost proportional to Log N to the base 2, and m CASE statements. Thus, RSM retrieves the root term definition. Thereafter, the parameters' expansions are hard-coded into the procedure. This method approximates the recursion aspects of DDM Object Generation by an implementation technique (e.g., CASE within CASE . . . etc.). Due to limitations in programming languages, there are only so many levels of nesting of case statements that are possible, hence making the method not expandable. This appears to be a hard limitation. If DDM expands to have more levels, the RSM will exhaust its usefulness. If DDM strings reach a depth exceeding the nesting limit, then redesigning of the code will have to be done. In addition, this method is not well suited to parsing, because DDM is not static. When parsing DDM Strings the parameters at each level of DDM term in the tree can appear in any order. The CASE within a CASE . . . does not provide all possible combinations of parameter ordering. Also, for each occurrence of the parameter in the dictionary, the semantic procedure associated with it is duplicated. The programs are hardcoded, and therefore difficult to maintain. Due to the increased size, the programs are more complex. In order to maintain the program, recompilation is performed each time. Hence, in order to obtain the definition of the DDM term, there is one retrieval necessary and one sequential search in the top level file. Then, a series of embedded CASE statements provide the rest of the DDM definition.

RSM Storage Methodology

RSM stores only the root or "top level" definitions. The constituent instance variables of the parameters are not defined. This means that only the top level codepoint definitions are stored as data. All the parameters derived through the root are hardcoded in the program. This results in the loss of information, including some of the necessary information required to parse and generate a DDM string. That is, all the information about the structure of the parameters is not available as data. If there are changes in the dictionary, this may result in consistency problems. While LCF stored all the information for all the codepoints, this method only stores the structural information for the top level codepoints. The storage requirements for RSM are approximately 1000+ 100 m per top level term assuming 1000 bytes for head and tail overhead plus 100 bytes per internal node. Hence, there are about (1000+100 m)k for the entire dictionary. The rest of the information for the structure of the parameters is hardcoded in the program as depicted in FIG. 9. Assuming there are N/10 top level objects, then the cost of storage is (1000+100 m) N/10 bytes.

Drawbacks of the LCF and RSM Methods

LCF maintains a set of files without constructing the definition. This means that each time a definition of an object is required, LCF has to reconstruct it using the methods described above. There is no added value to reconstructing the definition each time it is required since the same definition will be required over and over again. In addition, LCF does not keep a very compact form of each of the definitions of each of the parameters; it remembers information that is not needed, i.e., information that is not essential for parsing and generating. The invention herein overcomes these drawbacks by expanding the definition of a DDM command inside the data structure, and therefore not requiring its reconstruction each time it is accessed and by defining a short form of the data to describe the essence of the definition in a few bytes.

RSM only stores the top level node definition of the tree. The rest of the definition is hardcoded in the program. While this saves on space compared to the LCF method, RSM does not record the information of the root node in a compact fashion. RSM maintenance may be difficult due to hard coding of each parameter and duplication of code for each instance of the parameter in the dictionary. RSM is also subject to the limitations of programming languages such as the level of nesting of CASE statements. The invention herein overcomes these problems.

SUMMARY OF THE INVENTION

Inconveniences of other methods discussed above and elsewhere herein are remedied by the means and method provided by the instant invention which is described hereafter.

In accordance with one aspect of the invention a data transmission dictionary is provided, which is adapted for use by a computer system for encoding, storing, or retrieving hierarchically related data transmission information. The dictionary is comprised of a group of one or more computer searchable definition trees relating to transmission information of the computer system. The trees are derived from a first definition group which includes characteristics of commands, replies or data usable by the computer system. The characteristics include structure and value properties and restrictions, if any, applying to the commands, replies or data. Each tree represents, respectively, a definition of the command, reply or data to which it relates. Each tree includes a root node identified by name, such as a codepoint. The root node includes information describing the type of definition tree concerned (i.e., whether it relates to a command, reply or data), and may include one or more internal or terminal descendant nodes, which nodes represent components of the definition represented by the tree. The descendent nodes include level information describing the level of the node within its tree. The nodes may include attribute information, and may include value requirements relating to transmission information represented by the nodes.

The root node of each definition in the dictionary may include information relating to length restrictions of transmission information represented by its definition tree.

The attribute information may include a requirement as to whether data transmission information represented by a node is required, optional or ignorable.

The attribute information also may include information on length, repeatability or non-repeatability of data transmission information represented by the node.

Advantageously, the root node of each of the definition trees may be made-the sole accessible entry for the tree.

As their size tends to be compact the definition trees may be stored in main memory of the computer system using them for use by parsing or generating programming to process data transmission for the computer system.

Advantageously the definition trees are stored in a compact linear form preferably expressed in a depth first search form.

In accordance with another aspect of the invention there is provided a method of creating the data transmission dictionary, above, by deriving a group of one or more computer searchable definition trees from a first definition group of nodes defining portions of commands replies or data usable by a computer system, compacting each of the nodes by retaining only information necessary for the processing of data transmission streams according to the definition trees; assembling each definition tree by sequencing the compacted nodes in a linear form, starting with the root node of each of the definition trees, by placing information included in each compacted node in a resulting implemented dictionary; and by assembling each child node of said definition tree in turn. The process of assembling each child node involves placing information included in the child node in the resulting implemented dictionary and assembling each of the child's child nodes in turn. The process of assembling a terminal node involves placing information included in the terminal node in the resulting implemented dictionary.

In accordance with still another aspect of the invention means is provided for constructing the data transmission dictionary described above which comprise an extractor for deriving a group of one or more computer searchable definition trees from a first definition group of nodes defining portions of commands replies or data usable by a computer system. A compactor is provided for compacting each of the nodes while retaining only information necessary for the processing of data transmission streams according to the definition trees. An assembler is provided for assembling each definition tree starting with the root node for each tree.

The assembler can place information included in each compacted root node in the resulting implemented dictionary and assemble each of the compacted node's child nodes, if any, in turn. The assembler is adapted to place information included in each child node in the resulting implemented dictionary and to assemble each of said child's child nodes, if any, in turn.

In accordance with a further aspect of the invention the dictionary described above is incorporated into a computer system for use by it for encoding, storing, or retrieving hierarchically related data transmission information for use by said computer system internally or in communication with another computer system.

In accordance with another aspect of the invention there is provided a method of encoding and decoding a data transmission of one or more computer systems using the dictionary described above using the following steps:

separating the data transmission into command, reply, or data parts corresponding to individual definitions in the dictionary, and ensuring that the parts conform to required specifications of the data transmission protocol used by the system;

for each of the parts, retrieving a corresponding definition tree from the dictionary, and stepping through the data transmission ensuring that required information is present and that relevant rules are obeyed for the tree structure for each of said nodes encountered in the data transmission; and also ensuring that structural and value rules relating to the nodes, as described in the definition corresponding to the node are adhered to.

Advantageously, in the above method when used for encoding the data transmission the dictionary definitions serve as a roadmap for the translation of internal data structures of the computer system into a data transmission which conforms to requirements of the definitions.

Advantageously as well in the aforementioned method when used for decoding a data transmission the dictionary definitions serve as a roadmap for the verification of the data transmission according to the definition requirements and the translation into internal data structures of the computer system.

In accordance with another aspect of the invention there is provided a distributed computer system comprising a source system and destination system. The source system includes an application requestor, a parser and a generator supporting the application requestor. The destination system includes a server and a parser and generator supporting the server. The parsers and generators have access to one or more dictionaries constructed in accordance with the dictionary described above for the purpose of processing data transmissions between the source and destination systems.

The distributed computer system described above may contains the destination and source systems within one or a local computer system.

In accordance with yet another aspect of the invention a data processing dictionary is provided, which is adapted for use by a computer system for encoding, storing, or retrieving hierarchically related data processing information. The dictionary is comprised of a group of one or more computer searchable definition trees relating to data processing information of the computer system. The trees are derived from a first definition group which includes characteristics of commands, replies or data usable by the computer system. The characteristics include structure and value properties and restrictions, if any, applying to the commands, replies or data. Each tree represents, respectively, a definition of a the command, reply or data to which it relates. Each tree includes a root node identified by name. The root node includes information describing the type of definition tree concerned (i.e., whether it relates to a command, reply or data), and may include one or more internal or terminal descendant nodes, which nodes represent components of the definition represented by the tree. The descendent nodes include level information describing the level of the node within its tree. The nodes may include attribute information, and may include value requirements relating to data processing information represented by the nodes.

It may prove advantageous for some of the nodes of the tree to be linked to data stored by the data processing system for representing or accessing the data stored.

BRIEF DESCRIPTION OF THE DRAWINGS

FIG. 1 depicts DDM Objects.

FIG. 2 depicts a DDM Object Interchange Format.

FIG. 3 depicts a flowchart illustrating depth first searching.

FIGS. 4a,b illustrate an example DDM Object: Root Node as defined in the architecture.

FIGS. 5a,b illustrate an example of the Root Node OPNQRY.

FIG. 8 depicts an example of retrieving a definition for the LCF method.

FIG. 9 depicts a CASE method as used in RSM.

FIG. 11 depicts an example of retrieving a definition for the RSM method.

FIG. 12 depicts an ADDG Flowchart.

FIG. 13 depicts a flowchart for step 1 of ADDG; generate DDMTXT.

FIG. 16 depicts ADDG tool pseudocode.

FIGS. 17a-1 depict an implemented DDM dictionary and retrieval method in accordance with the instant invention.

FIG. 19 illustrates the DDM Dictionary Definition Syntax.

FIG. 22 illustrates a tree for the Command Data portion of OPNQRY.

DETAILED DESCRIPTION OF THE INVENTION

Figure 6:
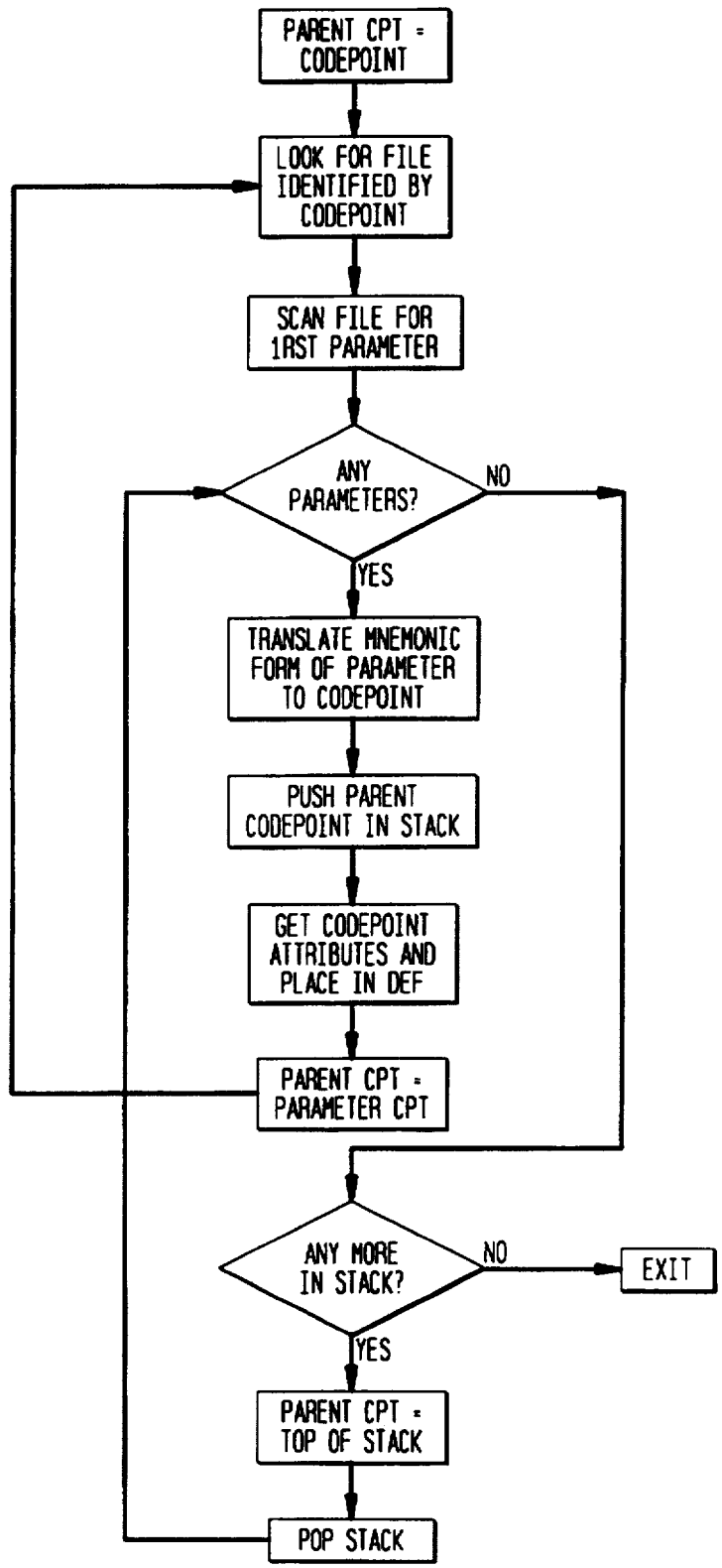
FIG. 6 comprises a diagram representing a method of constructing the definition for loosely coupled files.
Figure 7:
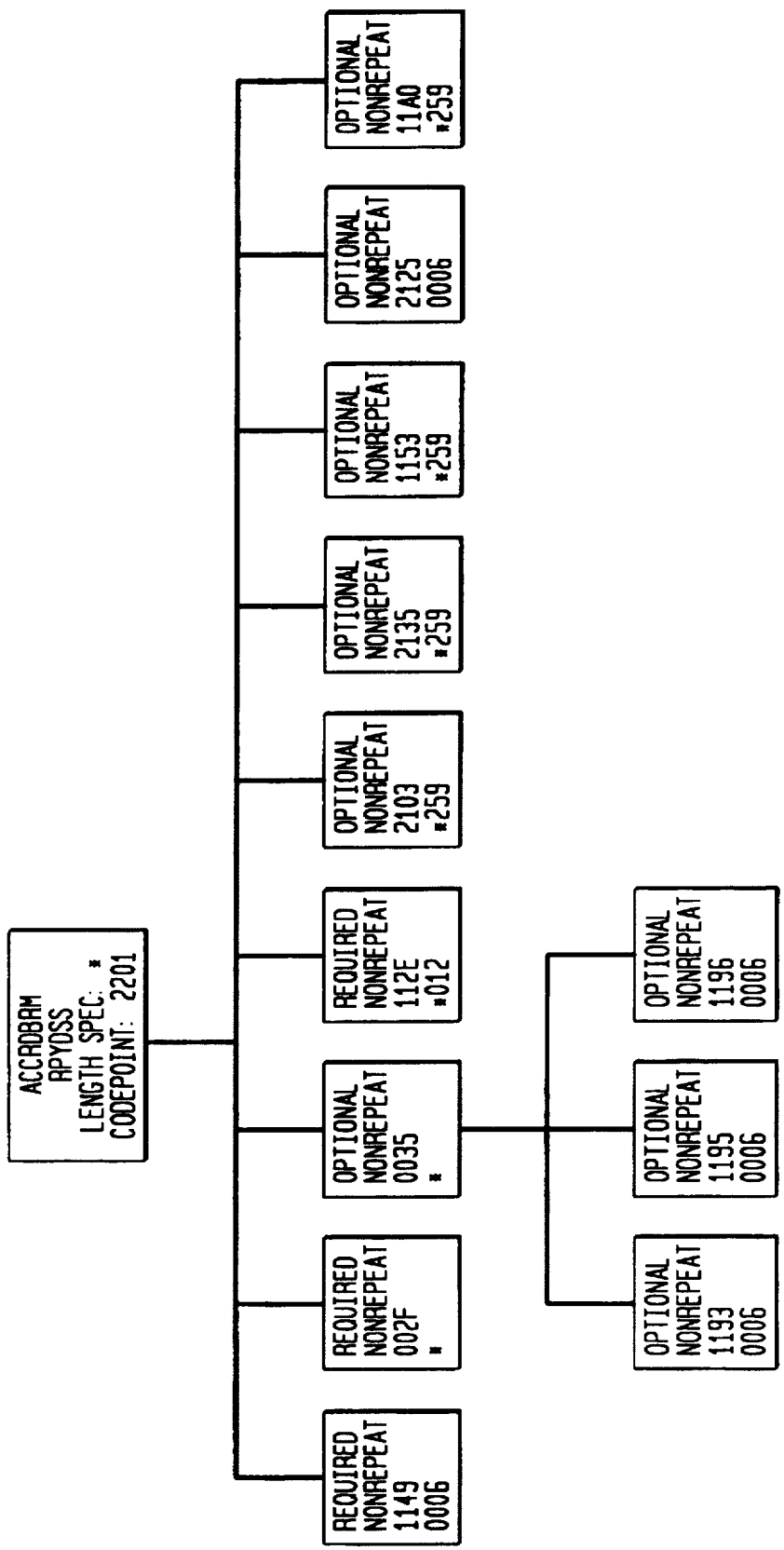
FIG. 7 illustrates a tree for the Command portion of ACCRDBRM.
Figure 10:
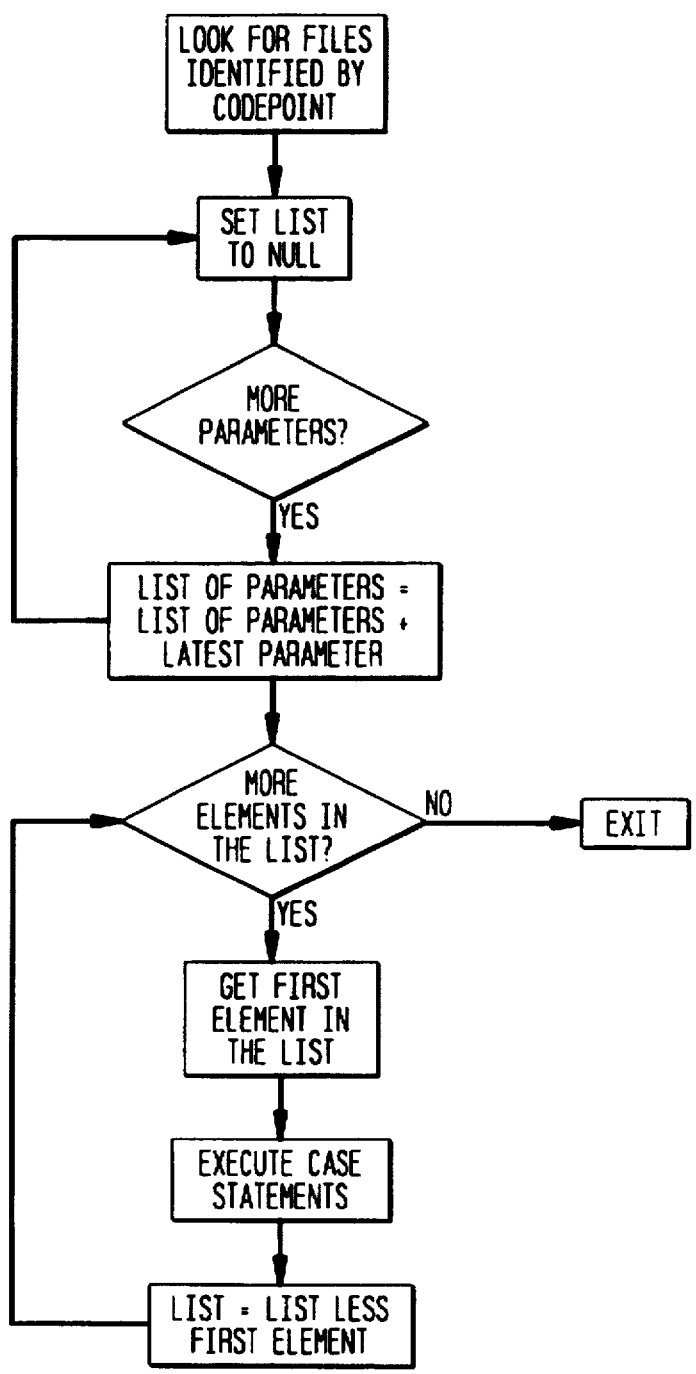
FIG. 10 comprises a diagram representing the construction of a DDM definition by the root storage method.

In the invention described herein below the definitions of DDM commands, replies, and data are stored in command, reply, and data trees, respectively.

This invention which will be termed the DDM Dictionary Structure Optimizer (including method and means) (DDSO) compacts the definition of nodes of the DDM command and reply data trees by retaining only the information necessary for parsing and generation of the DDM data streams. DDSO also assembles the definition of a DDM command, reply, or data by sequencing the compacted nodes in the corresponding tree in a depth first search manner. Definitions are created by first scanning the DDM Architecture document (which may be on line advantageously) and then by extracting the necessary information. Then, each of the definitions is assembled. In order to explain DDSO, it is first described how to create the DDM Dictionary structure of the invention from the DDM architecture document, then what the storage and retrieval methodologies are, and the formal specification of the definition syntax. Finally, we discuss the advantages and disadvantages of DDSO are discussed.

Creating the DDM Dictionary Data Structure

The DDM Dictionary Data Structure is a compact form of definitions derived from selections of the dictionary defined by the DDM architecture document. Each definition is expressed as a tree (having one or more nodes) in a linear form, and preferably expresses it in depth first search form, with each of the nodes defined in a compact form. In general, the steps are the following:

Step 0: (Extraction Stage)

Get all the codepoints (identifiers of the nodes) for the trees required in the forest. The DDM architecture provides a network of nodes that are pointing to each other. This stage extracts the nodes needed for the trees of the application. Only the root nodes are given to the Extraction Stage. This step calculates which nodes are needed for the definitions.

Step 1: (Compaction Stage)

Scan all the DDM files created in step 0 for essential information, i.e., the top level codepoint for each node and all node parameters. Retain the information in DDSO form for the parameter. The specifics of the DDSO form are described below. An example of DDSO form is: "RN1: 2401.*255", which indicates attributes (RN), level in the tree (1), unique identifier (2401) and length attribute (*255).

Step 2: (Assembly Stage)

This step assembles (expands) each of the parameters. This means that if a parameter itself has parameters (i.e., it is a parent) then the children are added in a depth first search manner, and they are given one level higher than that of the parent.

ADDG (Automated DDM Dictionary Generator) is a convenient tool which can be used to create one or more DDM Dictionary data structures (dictionaries) from the DDM architecture document. ADDG has three steps, as depicted in FIG. 12:

1. Generate DDMTXT

This exec steps through the DDM architecture document extracting the information required by the user. This includes the root nodes specified by the user, as well as all the nodes required in the expansion of the root nodes. Each of these nodes is extracted into a file with filename equal to the DDM mnemonic term and a file type of DDMTXT. Other files are generated, such as DDM FLVL which provides a list of all DDM terms which are going to be expanded; EXPCDPT FILE which provides a list of all valid part specifications (a part specification specifies whether the DDM object is a command, reply, or data object) and their corresponding DDM codepoints and DDM HEX which provides a list of all DDM mnemonics with corresponding codepoints. The generate_DDMTXT high level flowchart is depicted in FIG. 13.

2. Create DDM Definitions

Figure 14:
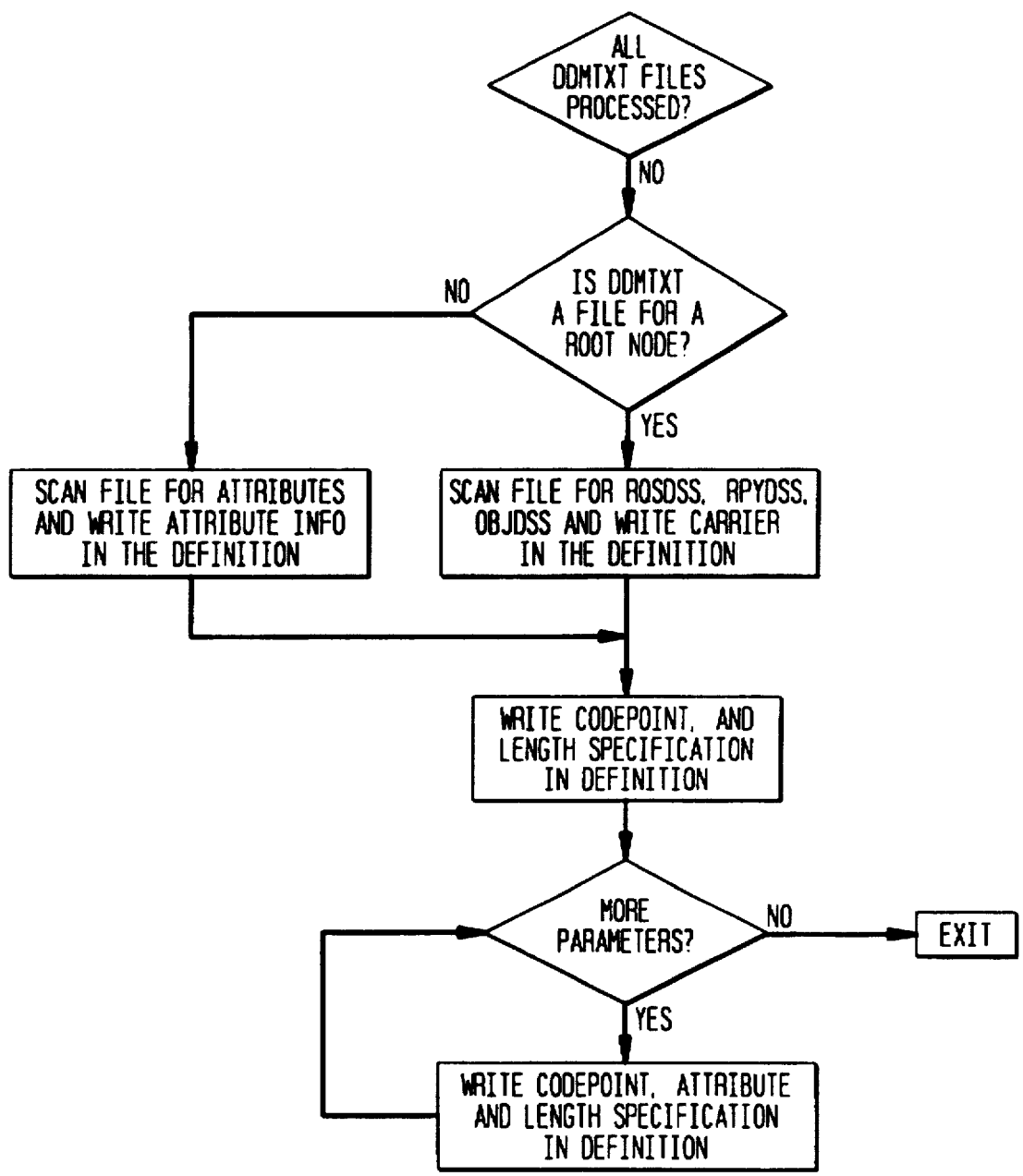
FIG. 14 depicts a flowchart for step 2 of ADDG; create DDM definitions.

The Generate_DDMTXT exec must be run before the Create_DDM-Definitions exec. Create_DDM Definitions creates the DDM_DEF FILE which contains a DDM definition for each DDM Term. It follows the specific rules that were setup in the DDSO form for the dictionary. Create_DDM_Definitions is depicted in FIG. 14.

3. Assemble DDM Definitions

Figure 15:
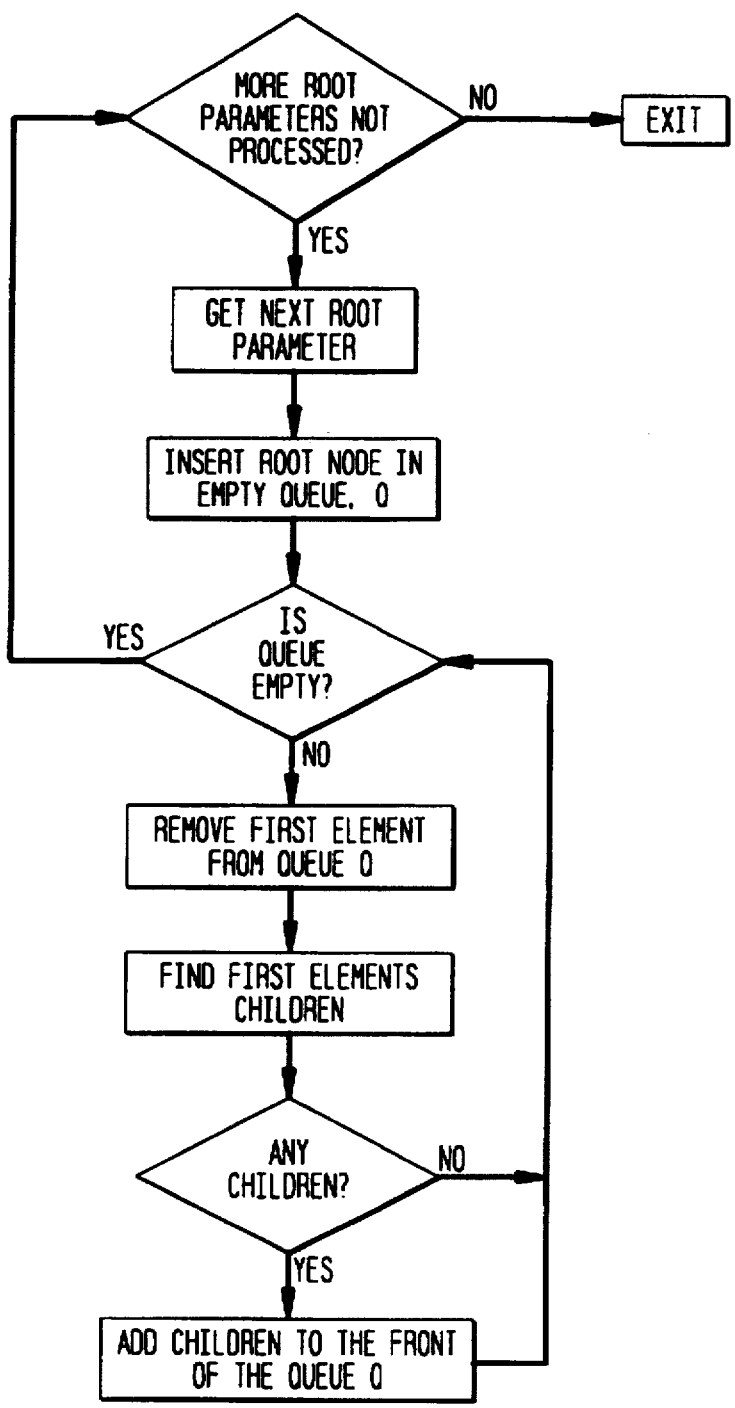
FIG. 15 depicts a flowchart for step 3 of ADDG; assemble DDM definitions.

The Generate_DDMTXT and Create_DDM_Definitions execs must have been executed before this exec is run. This exec assembles all top level DDM terms by assembling parts of several DDM definitions. It also contains the source language specific statements in order to store each definition. The definitions are stored in a file. Pseudocode for the Assemble DDM_Definitions is depicted in FIG. 15.

The pseudocode for the ADDG tool is shown in FIG. 16.

There are therefore two main operations involved in constructing the definition and these are compaction and assembly. Compaction involves storing each parameter in the compacted form, while assembly is an expansion process that reassembles a complete definition of a root node in depth first search format. It is possible to compact the definitions of each parameter without performing the assembly. Resulting storage savings over LCF will occur. However, the performance overhead of LCF to create the definition will have to be incurred, since the definition will have to be created at run-time as opposed to creating the definition before runtime, as is done in the instant invention. It is also possible to assemble the definition without compacting it. Due to the duplication of certain internal nodes, and large storage requirements for each node, this alternative may not prove attractive. However, if compaction and assembly are both done then maximum benefits may be obtained from the instant invention.

Storage Methodology

DDSO stores the DDM definition files in the format shown by the example depicted in FIGS. 17a-l. A DDM definition is a linear expression of a tree, assembled in depth first search manner, and contains information required, namely: information required for the root node and information stored for non-root nodes. The root node requires 6 bytes for its definition and each non root node requires 11 bytes. If there are m nodes in the tree then the tree requires 11 m+6 bytes. Hence, for N trees in a dictionary, 11 mN+6N bytes are required. In addition, a small search table requires 6 bytes per tree, hence 6N bytes. Therefore the total implementation requires 11 mN+12N bytes.

Note that in the example, the constants 11 and 6, i.e., the number of bytes per internal and root nodes respectively are slightly higher. Certain additional characters ( "/"'s) and punctuation (",") were added to improve human readability.

For the example application, approximately 5088 bytes of data are required for the dictionary itself and a small lookup table of about 510 bytes for the purposes of searching. Since the definition is already constructed, the cost of retrieval reduces to the cost of a search through the lookup table, e.g., the cost using binary searching.

1. Information Stored for Root Node

The following attribute information is stored for the root node:

(a) Carrier Type: i.e., whether it is a request, reply, or data object. In DDM there is one general format for the request data stream structure. The request envelope (RQSDSS) fields must be specified in a certain order because they are not self-defining structures. Only one command can be carried by a RQSDSS. Similarly, in DDM there is one general format for the reply data stream structure. All fields must be specified in the order required because the reply envelope (RPYDSS) is not a self-defining structure. Similarly, the data object envelope (OBJDSS) has a pre-specified format, and carries all objects except the commands and reply messages. An OBJDSS however may carry multiple objects;

(b) The codepoint of the root node;

(c) The length characteristic: The length characteristic includes descriptions for fixed length objects, variable length objects, objects with a maximum length, and objects with a minimum length.

2. Information Stored for Internal Nodes and Leaves (terminal nodes):

The following attribute information is stored for non-root nodes:

(a) whether the node is Required, Optional, or Ignorable;

(b) whether the node (and its descendents) are repeatable or not;

(c) the level or depth of the node in the tree;

(d) the length characteristic of that node.

The first attribute stored is the Required, Optional, or Ignorable attribute.

A Required attribute specifies that support or use of a parameter is required: when a parameter is specified as being required in a parameter list for a command, the parameter must be sent for that command. All receivers (of transmissions) supporting the command must recognize and process the parameter as defined. When specified in the parameter list of a reply message, the parameter must be sent for that reply message. All receivers must accept the parameter.

An Optional attribute specifies that support or use of a parameter is optional. When a parameter is specified as being optional for a parameter in a parameter list for a command, the parameter can optionally be sent for that command. All receivers supporting the command must recognize and process the parameter as defined and use the default value if it is not sent. When specified in the parameter list of a reply message, the parameter can optionally be sent for that reply message. All receivers must accept the parameter.

An Ignorable attribute specifies that a parameter can be ignored by the receiver of a command if the receiver does not provide the support requested. The parameter can be sent optionally by all senders. The parameter codepoint must be recognized by all receivers. The receiver can ignore the parameter value.

Figure 23:
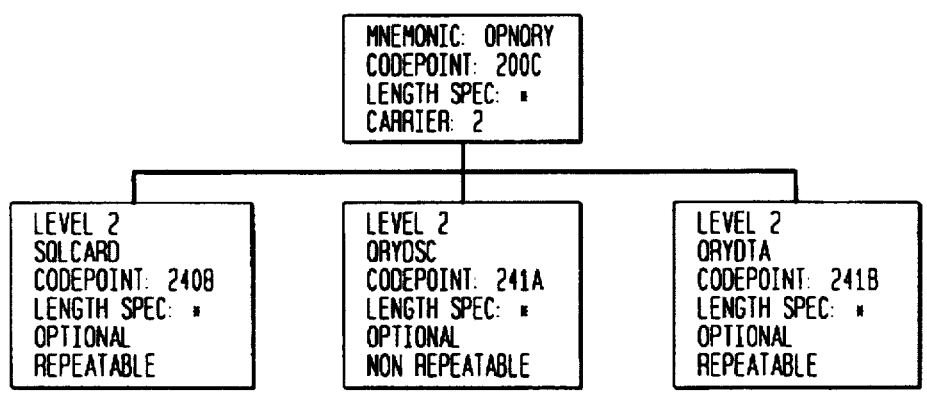
FIG. 23 illustrates a tree for the Reply Data portion of OPNQRY.
Figure 21:
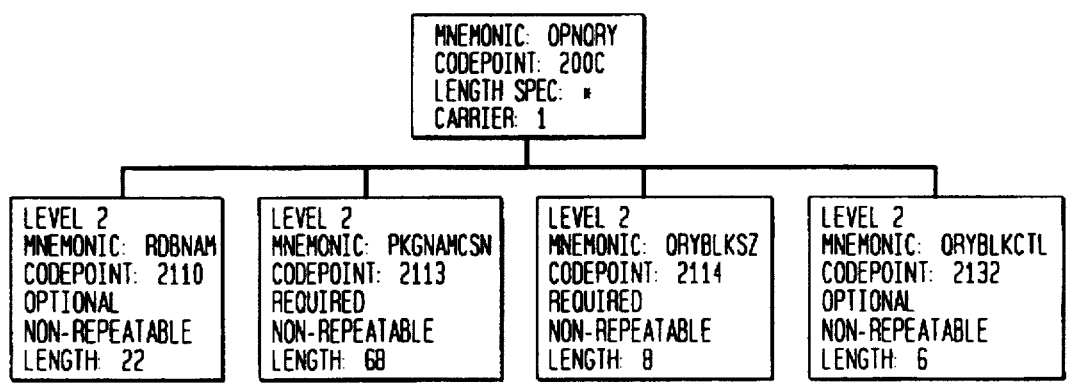
FIG. 21 illustrates a tree for the Command portion of OPNQRY.

Next is the Repeatable or Not Repeatable attribute. A Repeatable attribute specifies that a parameter can be repeated. If it is specified as Not Repeatable it can't. There are no requirements that the elements of the list be unique, or that the elements of the list be in any order. The information stored for root and non root nodes is logically depicted in FIGS. 21–23.

For example, a top level node with the description "1.200C.**** " has a carrier of 1 (request), codepoint of hex '200C' and variable length (i.e., up to an unspecified limit).

In addition, a parameter, or internal node, with the following description: "RN2:2408,*255" means that the parameter is required, non-repeatable, has a codepoint of hex '2408' and has variable length of up to 255.

Ordering of the Parameters

Figure 18:
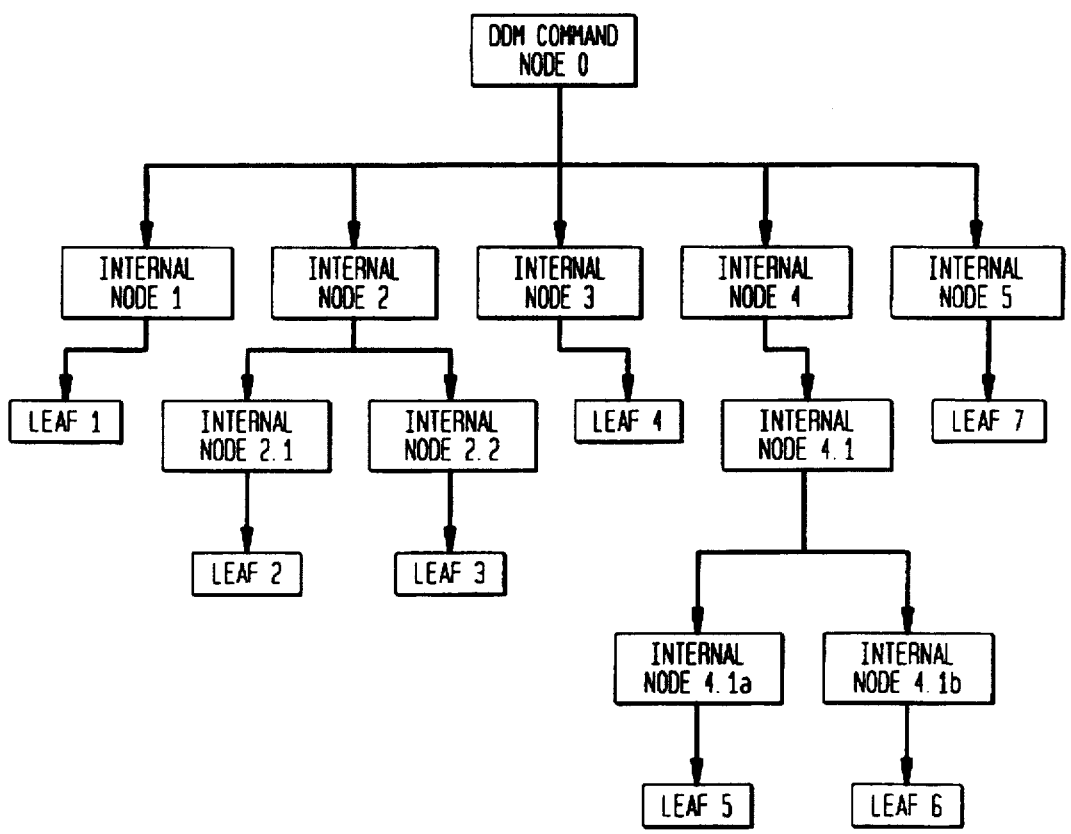
FIG. 18 comprises a representation of a DDM Command in the form of tree.

In the embodiment described the parameters for each full tree are listed in a linear fashion; for example, for the tree depicted in FIG. 18, the ordering of the parameter definitions in the tree for depth first search is: N0, N1, L1, N2, N2.1, L2, N2.2, L3, N3, L4, N4, N4.1, N4.1a, L5, N4.1b, L6, N5, L7, where:

N stands for Node, and

L stands for Leaf.

The order of the tree is maintained. The tree can be reconstituted in a hierarchical form, since depth first search order was used, and depth information was maintained.

Other Parameter Orderings: Because all the valid orderings in which DDM parameters sent-are all of the orderings of depth first search (not just those limited to the left-to-right notation convention) it is more convenient to store the definition in this manner. It would be possible, but more expensive to store them in another order. Additional information, e.g., parent information, would have to be added to the definition, so that the tree may be reconstructed from the linear form.

Retrieval Mechanism

In the embodiment of the invention described the retrieval mechanism is based on a simple search technique, a binary search. However, other suitable search methods can be used depending on the range of the codepoints, the values of the codepoints, the size of the forest to be implemented, etc.

DDM Dictionary Syntax

FIG. 19 depicts DDM dictionary definition syntax for commands, replies, and data using the embodiment of the invention described herein.

Interpretation Rules

The rules describing DDM Dictionary syntax can be interpreted as follows:

1. ":=" means "is defined by", e.g., A :=B means that A is defined by B.

2. "|" means logical or, e.g., A :=B | C, means that A is either defined as B or C.

3. Lower case characters represent terminal nodes of the definition and are defined as literals.

4. Upper case characters represent non-terminal nodes and are defined as a collection of terminals and non-terminals.

5. quotes : Items in quotes are literals. For example 'B' means the letter B.

Acronyms & Syntax used in FIG. 19

Carrier indicates the DSS carrier 0 indicates the DSS carrier used for partial replies 1 indicates the DSS carrier field RQSDSS (request DSS), used for commands;

2 indicates the DSS carrier field RPYDSS (reply DSS), used for replies;

3 indicates the DSS carrier field OBJDSS (object DSS), used for objects;

Codept indicates the DDM codepoint: identifier for the DDM term;

Maxlen indicates the maximum length of the DDM term;

Minlen indicates the minimum length of the DDM term;

Level indicates the level of the DDM tree, i.e., indicates the level of nesting with the parameter;

Length is the length of the DDM parameter;

**** means variable length;

$ signals the end of the definition;

LOWERA indicates a lower level architecture used by DDM. This allows for DDM to include other architectures.

The formal specification of the definition basically means the following (still referring to FIG. 19):

DDM_ENTRY: Line 1 is the top level entry and defines the root node. The root node can have either a request, reply or data object envelope and this is specified by the Carrier. A carrier for the specific application has four possible values, 0 through 3, but this can be extended for other types of envelopes. In addition to the carrier, the root node information includes the codepoint, Codept of the node and the length specification of the root node (the length specification of the root node is usually variable length although this is not required. The length specification can specify a fixed length field, a maximum length field, a minimum length field or a variable length field). The root node can be composed of DDM objects, referred to as DDM_PARMS (first line in the formal specification) or can be composed of objects of a lower level architecture and can either have itself a lower level data value (Line 2) or can be a collection of lower level objects (Line 3).

DDM_PARMS: If the root node contains a collection of DDM objects and lower level objects, then this DDM definition is followed. The DDM object can either be (a) a terminal object (Line 4), with information such as required/optional/ignorable, repeatable/non-repeatable, level of the terminal object in the tree (with root node being level 1), the codepoint and length characteristic; (b) A terminal object with lower level object contents, with the same characteristics as the terminal object above (Lines 5–6); (c) Two DDM_PARMS objects. This allows a DDM_PARMS object to recursively define itself in order to allow more than one terminal object and more than one depth in the tree (line 7); (d) One DDM_PARMS object. This is a syntactic trick to allow for the '$' which indicates the end of the object, and is required in the definition (Line 8).

LOWOBJ: Allows for the same structure as a DDM object and hence allows nesting and terminal nodes. The terminal nodes contain the same basic information as a DDM terminal node (Lines 9–11).

Line 12: A carrier can have values ranging from '0' to '3'. This can be expanded to more values as the need arises.

Line 13: The level of the parameter in the tree. The root has level 1 and its children have level 2. If a node has level i then its children have level i+1 .

Line 14 : Codept indicates any valid DDM codepoint.

Line 15 : Length characteristic for DDM: For example, it may take on the following values: (a) dddd, such as 1233, which means fixed length of 1233, (b) ****, which means variable length, (c) *maxlen, such as *255 which means that the DDM object has a maximum length of 255, (d) minlen*, such as 255*, which means that the DDM object has length of at least 255. Note that there are only four characters for length. This can easily be expanded as needed Lines 16 and 17 : Specification of minlen and maxlen Line 18 : "roi" means that the parameter is either required, optional, or ignorable.

Line 19 :"rn" means that the parameter is either repeatable or not.

Line 20 :"d" is any valid digit from 0 to 9.

It is possible to modify the formal specification of the syntax in various ways, without changing the intent and the meaning of the invention. Various ways of modifying it include: (a) adding more carrier types, (b) adding more attributes to the root node, or to the parameter nodes; as more attribute characteristics are added to the architecture, more attribute place holders or more valid values may be added to describe DDM; (c) length specifications could change such as to add more digits to one length specification, or to add a parameter which has both minimum and maximum length restrictions. As DDM evolves, the formal specification for the dictionary syntax will evolve as well.

EXAMPLE

The files depicted in FIGS. 5a,b can be stored as follows:
Request 1,200C,****/ON2:2110,0022/RN2:2113,0068/RN2:2114,0008/
ON2:2132,0006$ Command Data 3,200C,**/ON2:2412,,LOWERA/RR3:0010,**/
OR3:147A,****$ There are two degenerate cases one can look at to compare DDSO with LCF and RSM. These are:

(a) a tree with one node: while DDSO stores the node in compact form, LCF stores one node in one file; LCF still needs to scan the file, but does not need to perform the assembly. RSM in the case of the tree with one node reduces to LCF, since there are no CASE statements associated with one node. Hence in the case of the tree with one node, DDSO still maintains its advantage of storage compaction, but is still slightly better than LCF and RSM in performance.

(b) A forest with one tree: in this case, DDSO avoids the binary search. LCF and RSM still have to construct the definition. Hence, in the case of a forest with one tree, the invention has advantages.

How DDSO Definitions are Used

Figure 20:
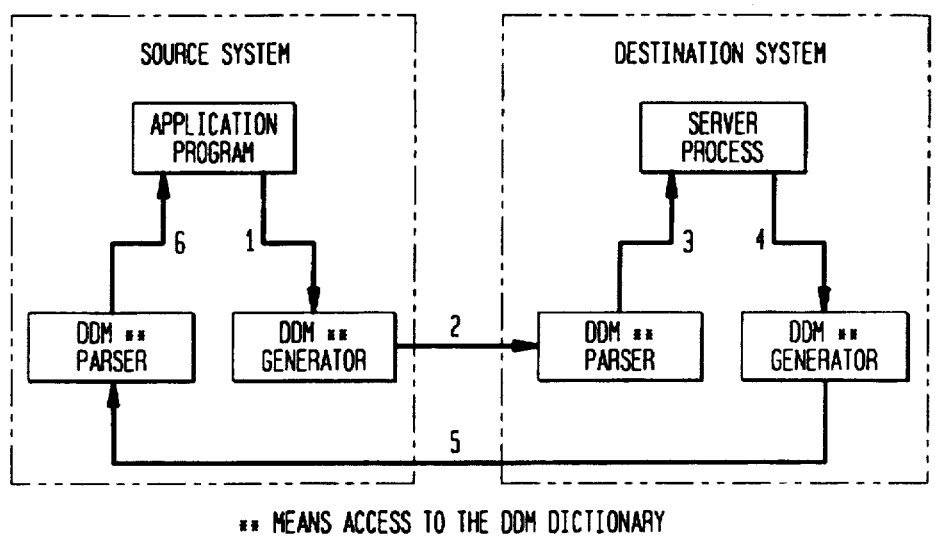
FIG. 20 depicts parsers and generators in a Distributed System.

The DDSO definitions are retrieved in both the parsing and the generation processing of DDM strings. Parsing means receiving a DDM string, checking its syntactic correctness and building the equivalent internal data structure for use by the local processor. Generation means receiving an internal data structure and building the DDM string using the definition tree. FIG. 20 depicts the parsing and generation process in a requester-server distributed system. An application program first submits a request in internal format.
(Step 1)

The request is translated into the DDM string by the generation process (the generator consults the DDM Dictionary to do this).
(Step 2)

Then, the request is sent to the server, which receives; it. The parser translates the request into internal format by consulting the DDM dictionary for syntax verification.
(Step 3)

Then, the internally formatted request is executed by the server. This can be one of various different suitable types, of servers such as file servers, or database servers.
(Step 4)

The server issues one or more replies in internal format, which are translated by the generator (Generator consults the DDM Dictionary) into a DDM string or strings.
(Step 5)

DDM reply is sent to the source system.
(Step 6)

Finally, the source system's parser translates DDM reply into internal format (Parser consults DDM Dictionary) and returns to the application program.

Conceptual Layering of DDM

In the specific embodiment described the parser and generator advantageously share a common design which stems from partitioning DDM data streams (DDM strings) into a series of layers. The first, or topmost layer, Layer Zero, consists of a DDM Command or a DDM Reply, which constitutes a logical object. A request for parsing or generating must always come at layer 0.

Next is

Layer One, which is derived from breaking up this logical object into one or more Data Stream Structures, or DSSs (or data communications envelopes) which are linked to each other. For example, the DDM Command to execute an SQL Statement is accompanied by various parameters as well as command data (the SQL statement). DSSs can include a command part and zero or more command data parts; or, a reply part and zero or more reply data parts; or, one or more reply data parts.

Layer Two consists of the structural properties of a tree without looking at the specific values of the nodes within that tree. An example of a structural property of the tree is the length value at each node which is the sum of its children's length plus a constant (for its own length field and codepoint, or identifier).

Finally

Layer Three: consists of each node of the DDM Tree. Each node has structural properties in the tree and valid required values. Examples of the structural properties within the tree include whether the node is required, optional, ignorable, repeatable, a collection, or a scalar. ("Collection" refers to an internal node, and "scalar" refers to a leaf node). Examples of values of the nodes: Leaf nodes carry values and these values carry certain restrictions. For example, leaves may be of certain data types, such as enumerated value data types or they may have certain length restrictions, such as maximum length. Non leaf nodes don't have values but have length restrictions.

SOFTWARE ARCHITECTURE FOR DDM PARSING AND GENERATION METHODS

Figure 24:
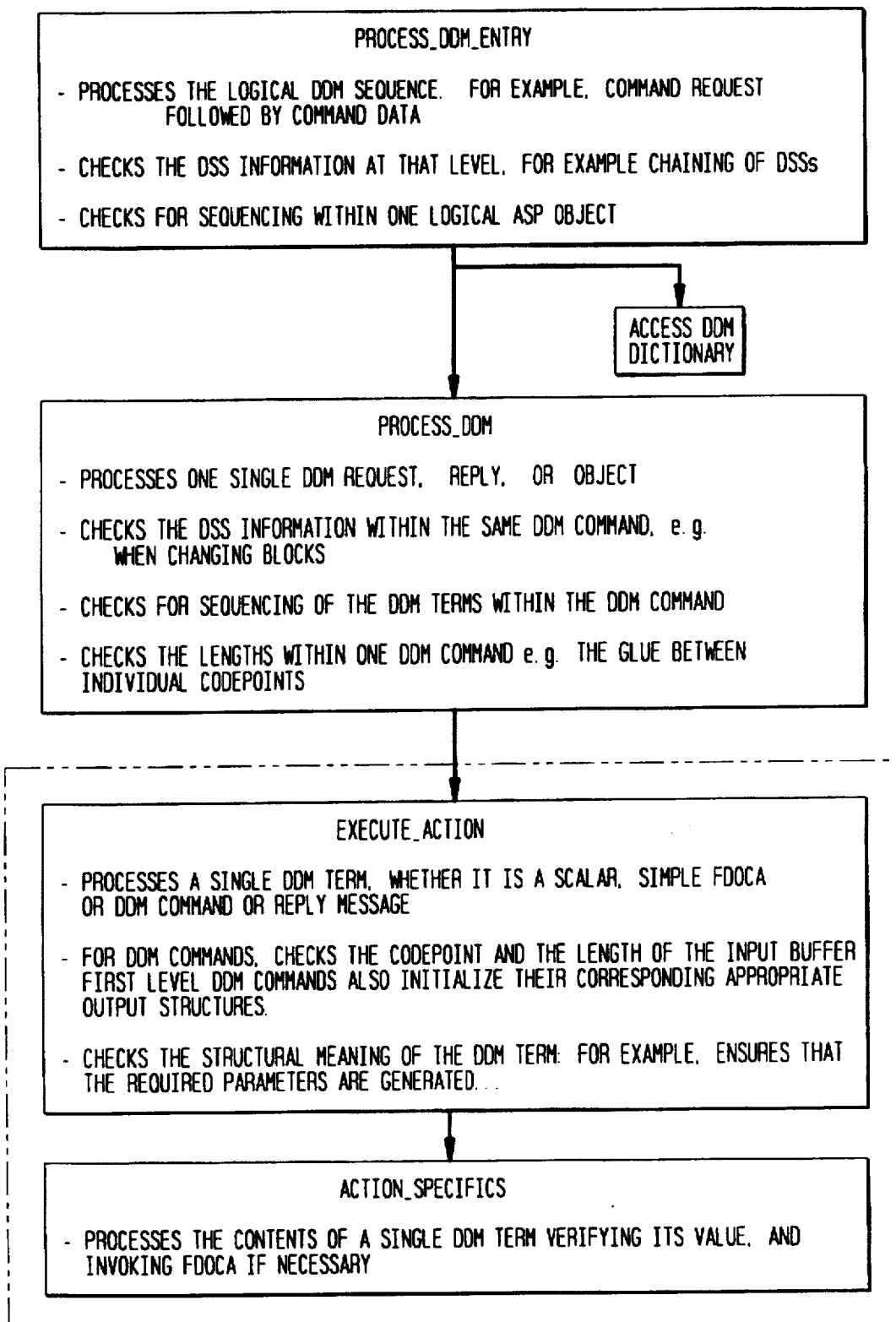
FIG. 24 depicts the method of parsing and generation employed by the instant invention.

There are three major levels of the DDM Parsing/Generation Process which correspond to the three layers mentioned above, and are depicted in FIG. 24.

The first level deals with the processing of a DDM Entry (Multiple Related Data Stream Structures): or relating two logical DDM Objects together. For example, a command must always be followed by command data if it has any. The "links" between the two Data Stream Structures (DSSs) (command, command data objects) are established by the processing of the DDM Entry. This level takes care of linking DSSs together, through various continuation bits, and ensures that the rules as defined by DDM architecture for linkage are enforced.

The second level involves processing one Data Stream Structure at a time. This level takes one of the DSSs and looks at its internal structure. Each DSS is composed of a tree. This level obtains the definition of the relevant DDM object from the DDM Dictionary, and then proceeds to step through the definition, and starts comparing it to the actual data received (parsing), or, uses it as a roadmap to generate the appropriate data stream (generation). While level 1 was concerned with the relationship between DSSs, level 2, the DDM layer, takes care of the relationships between the nodes within a DDM tree, with such activities as length checking for collection objects, etc.

The third level (the action level) concerns itself with individual nodes which include: Action Execution, Action Specifics, and a Link to a Lower Level Architecture. The Action Execution sublevel is the next natural level down and deals with individual nodes. These nodes have properties, such as: required, optional, ignorable, repeatable, etc. It is the responsibility of the Action Execution sublevel to ensure that required nodes are parsed or generated and that other structural properties of the codepoints are obeyed. The Action Specifics sublevel deals with the values in individual nodes. The nodes are either collection objects, (i.e., internal nodes: in which case they are composed of other DDM nodes), or they are scalars (i.e., leaf nodes). The collection objects have no specific values associated with them. The scalars do, and it is the responsibility of this sublevel of the hierarchy to ensure that the values parsed or generated are the correct ones. The length attribute is also verified against its corresponding definition in the dictionary. The third sublevel or the lower level architecture sublevel deals with more complex scalar objects defined in another architecture, such as the Formatted Data Object Content Architecture developed by IBM Corporation.

The common Parser and Generator design provides the following advantages including maintainability, generality, and non-recursive methodology.

Maintainability is due to the fact that changes in the syntax of DDM are only limited to the action specifics portion. For example, if a parameter changes, it is very easy to locate the unique instance of its action in the code. Also, the common logic makes it easier to maintain the code. The Parsing and Generation processes use common data structures, such as the Length Tree Data Structure.

The code is very general, in that changes in the dictionary are localized to the action specifics (Generality). One could merely change the action specifics part and have a Parser and Generator for a Distributed File System Application, for example. The structure of DDM is followed and hence changes can easily be incorporated.

The actions described above are for a Data Base Application. However, it would be relatively easy for a person skilled in the art herein to build a set of actions for another application of DDM and substitute the new set to achieve the intended results.

Another advantage of the use of the dictionary of the invention is that the method of use simulates recursion by having a completely expanded dictionary. That is, the DDM Tree is expanded in a depth-first search manner. Therefore, the method has the advantages of a recursive solution without the overhead of the actual recursion.

Advantages of DDSO

In terms of storage requirements DDSO shows useful advantages. The efficient utilization of storage is due to the fact that only essential information is retained. The dictionary is encoded into a specific format so that it will contain the definition in its most minimal form while still including information about all the nodes in the tree of the definition including the optionality information about the node, the node's length information, and the node's level information.

Also there is only one dictionary access per top level DDM definition. One dictionary access gives access to the entire definition as opposed to the definition of the node only. By comparison, LCF requires as many accesses as the number of parameters in the tree. RSM requires one access per top level node, but only provides structural information for the top level node and not the entire definition tree.

In addition to being more storage efficient and requiring only one dictionary access to obtain the full definition, DDSO constructs the definition prior to compile time. Since the definition has been expanded prior to compilation, the recursive step is not done at run time which would be at the expense of the user. DDSO incurs the cost once per definition prior to compiling the code. DDSO uses binary searches into a table of top-level nodes. DDSO could also utilize other search methods, such as hashing etc. LCF and RSM appear to be limited to sequential search methods.

DDSO code is less complex. DDSO has a unique action for the same node and hence does not duplicate code unnecessarily. DDSO is independent of the programming language. Also, DDSO can use a table driven method while RSM has hardcoded programs. DDSO encodes the definitions as data. A change in DDM architecture would require RSM to change the program rather than just the data. For clarity, maintenance, and simplicity, the table driven approach has advantages. Also, the method is expandable for future use. DDSO appears to be independent of programming language, while RSM appears limited to the number of nestings of CASE statements allowed in the implementation of programming languages.

DDSO compacts the definitions, and defines a grammar to describe DDM. The expansion of the trees is done before compile time, and hence the recursive step of LCF need not be done for each DDM tree parsed or generated. DDSO is a table-driven method, in which the table contains the node identifier followed by a pointer to the already expanded definition.

DDM Dictionary Data Structure Example

An example of a DDM dictionary according to the invention herein is depicted in FIGS. 17a-1. Some points to note about the example are:

1. Data Structures Used:

In this example, a DDM Dictionary data structure and retrieval mechanism are discussed. It is composed of the following declarations:

TABLE : a table containing:
  Specification and codepoint: used to search for a root level codepoint concatenated with the specification, which indicates: CD-command data, CP-command part, RD-reply data to distinguish between carrier types.
  Length of definition
  Pointer of definition: this points to the definition of the tree. This table is used for binary search. The specification and root level are listed in alphabetical/numerical order.
TBLBASE: a pointer to the table used to remember the starting location of the table.
TBL_PTR: a pointer used to search through the table
DDM_TBL: a template used in conjunction with TBL_PTR to search in the table and obtain the necessary fields.

2. Specific Method to Retrieve the Data
  (a) Find out part specification and codepoint in last four character positions.
  (b) Do a binary search in the table to match desired codepoint. When found, then move to the definition buffer area.

The retrieval mechanism depicted in FIGS. 17k,l is based on a simple binary search. However, other search methods can be used to fit the particular application.

The above-described embodiments are merely illustrative of the application of the principles of the invention. Other arrangements may be devised by those skilled in the art without departing from the spirit and scope of the invention.

What is claimed is:

1. A method of processing a data transmission using a hierarchical data dictionary, comprising the steps of:

receiving from a source system a data transmission string expressing a tree-structure data in a compacted form, wherein said tree-structure data contains a compacted root node corresponding either to a request type command, a reply type command, or an object type command, followed by one or more compacted parameters corresponding to nodes linked thereto, each said linked node corresponding to data required by said compacted root node for said command, said compacted root node and said one or more compacted parameters expressing said tree-structure data in a linear depth-first manner;

using the hierarchical data dictionary to parse said data transmission string, including said compacted root node and said one or more compacted parameters, to determine whether required information is present and whether relevant rules are obeyed for the type of command specified by said compacted root node, and further ensuring that structural and value rules for said linked nodes corresponding to the type of command specified by said compacted root node are adhered to; and assembling one or more commands and parameters from said data transmission string.

2. The method of claim 1, wherein said step of parsing said data transmission string further comprises the step of checking said data transmission string for the semantic correctness of a compacted form thereof.

3. The method of claim 1, wherein said one or more commands and parameters assembled from said data transmission string are recognized by a server in a destination system and a executed by a server processor in said destination system.

4. The method of claim 3, wherein said data transmission string is a communications packet.

5. The method of claim 4, wherein subsequent to execution of said one or more commands and parameters assembled from said data transmission string a reply command is returned from said server processor.

6. The method of claim 5, wherein said reply command is translated into a data transmission string expressing said reply command into a compacted reply type tree-structure data, wherein said compacted reply type tree-structure data for said reply command contains a compacted reply type root node, followed by one or more compacted reply type parameters corresponding to reply type nodes linked thereto, each said linked reply type node corresponding to data required by the reply type root node for said reply command, said reply type root node and said one or more compacted reply type parameters expressing said tree-structure data in a linear depth-first manner.

7. A method of encoding a data transmission command using a tree-structure data dictionary, comprising:

submitting either a reply type command, a request type command, or an object type command to an internal processor, said command being recognized by a source system that includes said internal processor;

using said reply type command, said request type command or said object type command to retrieve a tree-type data structure from the tree-structure data dictionary, wherein said tree-type data structure is a data transmission string including a compacted root node located at the head of said tree-type data structure, said compacted root node specifying whether said tree-type structure corresponds either to said request type command, said reply type command, or said object type command, followed by one or more compacted parameters corresponding to nodes linked to said compacted root node in a branched fashion, each said linked node corresponding to data required by the type of command specified by said compacted root node, wherein said data transmission string includes said compacted root node and said compacted parameters in a linear depth-first manner to provide a flat representation of said tree-type data structure;

transmitting said data transmission string for processing by a server in a destination system.

8. The method of claim 7, wherein said data transmission string is received at a destination system, and wherein said destination system uses a hierarchical data dictionary to parse said data transmission string, including said compacted root node and said compacted parameters, to determine whether required information is present and whether relevant rules are obeyed for the type of command specified by said compacted root node, and further ensuring that structural and value rules for said linked nodes corresponding to the type of command specified by said compacted root node are adhered to.

9. The method of claim 8, wherein said destination system assembles one or more commands and parameters from said data transmission string.

10. The method of claim 9, wherein said one or more commands and parameters are recognized by a server in said destination system and are executed by a server processor in said destination system.

11. The method of claim 10, wherein said data transmission string is a communications packet.

12. The method of claim 11, wherein subsequent to execution of said one or more commands and parameters assembled from said data transmission string a reply command is returned from said server processor.

13. The method of claim 12, wherein said reply command is translated into a data transmission string expressing said reply command into a compacted rely type tree-structure data, wherein said compacted reply type tree-structure data for said reply command contains a compacted reply type root node, followed by one or more compacted reply type parameters corresponding to reply type nodes linked thereto, each said linked reply type node corresponding to data required by the reply type root node for said reply command, said reply type root node and said one or more compacted reply type parameters expressing said tree-structure data in a linear depth-first manner.

14. A distributed computer system comprising a source system and a destination system, comprising:

means for submitting either a reply type command, a request type command, or an object type command to an internal processor in the source system;

means for using said reply type command, said request type command or said object type command to retrieve a tree-type data structure from a data dictionary, wherein said tree-type data structure is a data transmission string including a compacted root node located at the head of said tree-type data structure, said compacted root node specifying whether said tree-type structure corresponds either to said request type command, said reply type command, or object type command, followed by one or more compacted parameters corresponding to nodes linked to said compacted root node in a branched fashion, each said linked node corresponding to data required by the type of command specified by said compacted root node, wherein said data transmission string includes said compacted root node and said compacted parameters in a linear depth-first manner to provide a flat representation of said tree-type data structure;

means for transmitting said data transmission string for processing by a server in the destination system.

15. The system of claim 14, wherein said data transmission string is received at the destination system, and further comprising a parser in the destination system for using a data dictionary to parse said data transmission string, including said compacted root node and said compacted parameters, to determine whether required information is present and whether relevant rules are obeyed for the type of command specified by said compacted root node, and further ensuring that structural and value rules for said linked nodes corresponding to the type of command specified by said compacted root node are adhered to.

16. The system of claim 15, wherein said destination system further comprises an assembling means, for assembling one or more commands and parameters from said data transmission string.

17. The system of claim 16, wherein said one or more commands and parameters are recognized by a server in the destination system and are executed by a server processor in the destination system.

18. The system of claim 17, wherein said data transmission string is a communications packet.

19. The system of claim 18, wherein subsequent to execution of said one or more commands and parameters assembled from said data transmission string a reply command is returned from said server processor.

20. The system of claim 19, wherein said reply command is translated into a data transmission string expressing said reply command into a compacted rely type tree-structure data, wherein said compacted reply type tree-structure data for said reply command contains a compacted reply type root node, followed by one or more compacted reply type parameters corresponding to reply type nodes linked thereto, each said linked reply type node corresponding to data required by the reply type root node for said reply command, said reply type root node and said one or more compacted reply type parameters expressing said tree-structure data in a linear depth-first manner.

21. A method of processing a data transmission using a data dictionary, comprising the steps of:

receiving a data transmission string in a destination system;

retrieving a definition for a command corresponding to said data transmission string;

using said definition for said command as a reference into the data dictionary to retrieve a tree-structure data corresponding to said command, wherein said tree-structure data contains a compacted root node corresponding either to a request type command, a reply type command, or an object type command, followed by one or more compacted parameters corresponding to nodes linked thereto, each said linked node corresponding to data required by said root node for said command, said root node and said one or more compacted parameters expressing said tree-structure data in a linear depth-first manner;

using said tree-structure data to generate one or more commands and parameter; recognized by a server in said destination system.

22. The method of claim 21, further comprising:

parsing said data transmission string by checking said data transmission string for the semantic correctness of the compacted form thereof.

23. The method of claim 22, wherein said data transmission string is a communications packet containing one or more commands and data associated therewith recognized by said server in said destination system.

24. A method of encoding a data transmission command using a dictionary, comprising:

using a reply type command, a request type command or an object type command as a reference into a data transmission string dictionary in order to retrieve a root node therefrom;

generating a compacted linear string from said root node, said compacted linear string having a tree-type structure including said root node, corresponding either to a request type command, a reply type command, or an object type command, and one or more parameters corresponding to nodes linked to said root node in a branched fashion, each said linked node corresponding to data required by the type of command specified by said root node;

transmitting said compacted linear string to a destination system for processing.

25. The method of claim 24, wherein said destination system parses said compacted linear string to determine whether required information is present and whether relevant rules are obeyed for the type of command specified by said root node, and further ensures that structural and value rules for said linked nodes corresponding to the type of command specified by said root node are adhered to.

26. The method of claim 25, wherein said destination system assembles a destination command from said compacted linear string.

27. The method of claim 26, wherein said destination command is recognized by a server in said destination system and is executed by a server processor in said destination system.

28. The method of claim 27, wherein said compacted linear string is mapped into a communications packet.

29. The method of claim 28, wherein subsequent to execution of said destination command a destination reply command compacted linear string is returned to said source system.

30. The method of claim 29, further comprising:

using a destination reply type command as a reference into a destination data stream dictionary in order to retrieve a destination reply command root node therefrom;

generating said destination reply command compacted linear string from said destination reply command root node, said destination reply command compacted linear string having a tree-type structure including said destination reply command root node and one or more destination reply command parameters corresponding to nodes linked to said destination reply command root node in a branched fashion, each said linked node corresponding to data required by the type of command specified by said destination reply command root node;

transmitting said destination reply command compacted linear string to said source system for processing.

31. The method of claim 30, wherein said destination reply type command is received from said destination system server upon execution of said destination command.

32. The method of claim 24, wherein said commands are generated by an internal processor and provided to a source system for generation of said compacted linear string.

33. A distributed computer system comprising a source system and a destination system, comprising:

means for using said reply type command, said request type command or said object type command as a reference into a data transmission string dictionary in order to retrieve a root node therefrom;

means for generating a compacted linear string from said root node, said compacted linear string having a tree-type structure including said root node, corresponding either to a request type command, a reply type command, or an object type command, and one or more parameters corresponding to nodes linked to said root node in a branched fashion, each said linked node corresponding to data required by the type of command specified by said root node;

means for transmitting said compacted linear string to a destination system for processing.

34. The system of claim 33, further comprising:

a parser in the destination system for parsing said compacted linear string to determine whether required information is present and whether relevant rules are obeyed for the type of command specified by said root node, and further ensures that structural and value rules for said linked nodes corresponding to the type of command specified by said root node are adhered to.

35. The system of claim 34, wherein said destination system further comprises an assembling means for assembling a destination command from said compacted linear data transmission string.

36. The system of claim 35, wherein said destination command is recognized by a server in the destination system and is executed by a server processor in the destination system.

37. The system of claim 36, wherein said compacted linear string is mapped into a communications packet.

38. The system of claim 37, wherein subsequent to execution of said destination command a destination reply command compacted linear string is returned to said source system.

39. The system of claim 38, further comprising:

means for receiving said destination reply type command from said destination system server, said destination reply type command being internally recognized by said destination system;

means for using said destination reply type command as a reference into a destination data stream dictionary in order to retrieve a destination reply command root node therefrom;

means for generating said destination reply command compacted linear string from said destination reply command root node, said destination reply command compacted linear string having a tree-type structure including said destination reply command root node and one or more destination reply command parameters corresponding to nodes linked to said destination reply command root node in a branched fashion, each said linked node corresponding to data required by the type of command specified by said destination reply command root node;

means for transmitting said destination reply command compacted linear string to said source system for processing.

40. The system of claim 33, wherein said commands are generated by an internal processor and provided to a source system for generation of said compacted linear string.

* * * * *